United States Patent
McCrady et al.

(10) Patent No.: US 7,210,135 B2
(45) Date of Patent: Apr. 24, 2007

(54) DATA FLOW ANALYSIS OF TRANSACTIONAL PROCESSES

(75) Inventors: Donald James McCrady, Redmond, WA (US); Paul F. Ringseth, Redmond, WA (US); Bimal Mehta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 10/648,461

(22) Filed: Aug. 26, 2003

(65) Prior Publication Data

US 2005/0050527 A1    Mar. 3, 2005

(51) Int. Cl.
*G06F 9/45* (2006.01)
(52) U.S. Cl. .............. 717/140; 717/142; 717/144; 717/154; 717/155; 717/156
(58) Field of Classification Search ......... 717/132–152
See application file for complete search history.

(56) References Cited

U.S. PATENT DOCUMENTS 6,016,398 A * 1/2000 Radigan ............... 717/152
2004/0117772 A1 * 6/2004 Brand et al. ............ 717/132

* cited by examiner

*Primary Examiner*—Meng-Al T. An
*Assistant Examiner*—Mark P. Francis
(74) *Attorney, Agent, or Firm*—Woodcock Washburn LLP

(57) ABSTRACT

A XLANG/s compilation method is provided that uses data flow analysis of a program's flow graph to determine lifetimes of a data object. A flowgraph is created according to abstract computer instructions. A depth-first order is assigned to basic blocks and a dominance relationship between the basic blocks is determined. A determination is made as to whether any loops are present within the flowgraph and, if so, the loops are identified. A creation point, destruction point and lock point for the data object is determined. Instructions are inserted into the computer code to create the at least one data object at the creation point, to destroy the data object at the destruction point and to lock the data object at the lock point.

6 Claims, 15 Drawing Sheets

DATA FLOW ANALYSIS OF TRANSACTIONAL PROCESSES

FIELD OF THE INVENTION

The present invention relates generally to computer software compilers. More particularly, the present invention relates to a XLANG/s compilation method that performs static data flow analysis of program code at compile time. Even more particularly, the present invention relates to such a method that automatically determines data object create, lock and destroy points at compile time by way of such static data flow analysis.

BACKGROUND OF THE INVENTION

A business may use a web service to interact with other entities via a distributed environment, such as the Internet or World Wide Web. To ensure that such an interaction is accomplished successfully, one or more protocols must be in place for carrying messages to and from participants, and specific business applications must also be in place at each participant's end. Such interactions are message driven. For example, a buyer sends a purchase order to a seller. The seller then checks its inventory to determine if it can provide the ordered items. If so, the seller sends an acknowledgement back to the buyer with a price. Finally, the buyer accepts or rejects the seller's offer (and/or possibly places another order). As evident in this example, each participant's business application reacts to the receipt of messages.

Web services use computer programs based on software code to implement message-based business transactions such as those described above. Such software code is in turn implemented in a programming language. Programming languages typically allow a programmer to declare one or more data objects, such as a variable, that hold the state of the program.

In a message-oriented language that is capable of implementing the business transactions discussed above, a data object may be a message that is received as input from some outside source. Such a message may be quite large, and therefore the storage of multiple data objects may consume a great deal of memory resources. Thus, a data object should be deleted, or "destroyed," once the data object is no longer needed for the proper operation of the software. Conventionally, destroy points, which are code instructions to destroy one or more data objects, are manually inserted into the software code by a programmer. A programmer will usually select the particular data object to be destroyed and the location within the code where such deletion is to occur. Typically, a programmer will attempt to place the destroy point immediately after the last use of the data object. In such a manner, the data object is retained in memory for as brief a duration as possible.

As a result of being performed manually, such a conventional method of destroying data objects therefore has a potential for human error in the placement of the destroy points and the selection of data objects to be deleted. An additional shortcoming is present in the context of a program that is implementing a message-based transaction. For example, in such a program, messages may be interrupted or other errors may occur that invoke special, "compensation" software components that may resend a message or may attempt some other process to rectify, or compensate for, the error. Compensation components add complexity to the software code, thereby making the programmer's task of selecting the proper location within the code where a destroy point should be located even more difficult. In addition, program code for message-based transactions may be especially complex, with many operations being processed in parallel, with the possibility that some of the operations may not complete or may invoke a compensation component at runtime. Therefore, selecting a location for a destroy point in such a situation is difficult, as every possible logic path that may be taken during processing must be accounted for.

The above description of the shortcomings of conventional placement of destroy points applies equally to "create" and "lock" points, as well as to any other type of data object handling operations. A create point is a location within software code where a data object is created. Ideally, a create point should be placed immediately before the data object is first used, again to reduce the consumption of memory resources. A lock point is a location within software code where a set of shared objects, such as a variable, is made inaccessible to program components that are not involved with a current transaction. In this way, the value(s) assigned to the data object cannot be changed by an outside component during the transaction, which therefore avoids errors during processing. Like create points, lock points should be placed as close to the use of a data object as possible, to avoid locking the variable unnecessarily. However, in software program that implements message-based transactions, an improper placement of a lock point may, in the event of a message error or another type of error, cause the program to have faults or to even stop operating. In complex software, it becomes increasingly difficult for a programmer to keep track of all the possible logic paths and attendant compensation components to place lock points at an optimal location: as close as possible to the use of a data object without being in a location that could cause faults if an error occurs.

As should be known to those skilled in the art, a compiler converts the high-level code used by programmers into a machine-readable language that can be more quickly executed at run time. At compile time, a compiler maps out the different possible logic paths that may be taken by the program to create a flowgraph of such logic paths. The flowgraphs are used for semantic analysis of program correctness and to generate the most efficient code.

A conventional compiler lacks the functionality to analyze a program, and/or produce flowgraphs, in such a way as to be able to determine the optimal placement of create, lock and/or destroy points. In addition, a conventional compiler lacks the ability to insert such points into the program so the corresponding data objects will be created, locked and/or created at the appropriate points at run time.

Accordingly, what is needed is a method for analyzing software, such as XLANG/s, that is capable of implementing message-based transactions in such a way as to be able to determine appropriate points for data object operations. More particularly, what is needed is a method for creating a flowgraph of a program that is capable of supporting analysis of the program's handling of data objects. More particularly, what is needed is a method of compiling computer code that involves generating a flowgraph and performing static data flow analysis on such a flowgraph to determine appropriate create, lock and destroy points for data objects in the program. Even more particularly, what is needed is a compiler that performs such an analysis of a flowgraph associated with such a program and determines whether data object errors will occur at runtime.

SUMMARY OF THE INVENTION

In light of the foregoing limitations and drawbacks, a XLANG/s compilation method is provided that uses data flow analysis of a program's flow graph to determine lifetimes of its data objects, such as variables. According to the method, a flowgraph is created according to abstract computer instructions, wherein the flowgraph has a plurality of basic blocks and a data object, and wherein the abstract instructions are translated from a parse tree formed from computer code. A depth-first order is assigned to the basic blocks and a dominance relationship between the basic blocks is determined. A determination is made as to whether any loops are present within the flowgraph and, if so, the loops are identified. A determination is also made as to the usage of the data object, and according to the usage, identified loops, dominance relationships and depth-first order of the plurality of basic blocks, a creation point, destruction point and lock point for the data object is determined. Instructions are inserted into the computer code to create the data object at the creation point, to destroy the data object at the destruction point and to lock the data object at the lock point.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

A XLANG/s compilation method is provided that parses XLANG/s code into one or more flowgraphs representative of the logical operation of the code. The method identifies a data object such as, for example, a variable in the flowgraph and tracks the operations that are performed on such data object. The method also places a creation point for such an object at an optimal location within XLANG/s code as late as possible prior to the object's first use. In addition, the method places a destruction point for such data object as early as possible after such object's last use. The method further places a lock point for a shared data object at an optimal location: at a location that avoids deadlocked code, while being as close prior to the first use of such object as possible.

Exemplary Computing Environment

Figure 1:
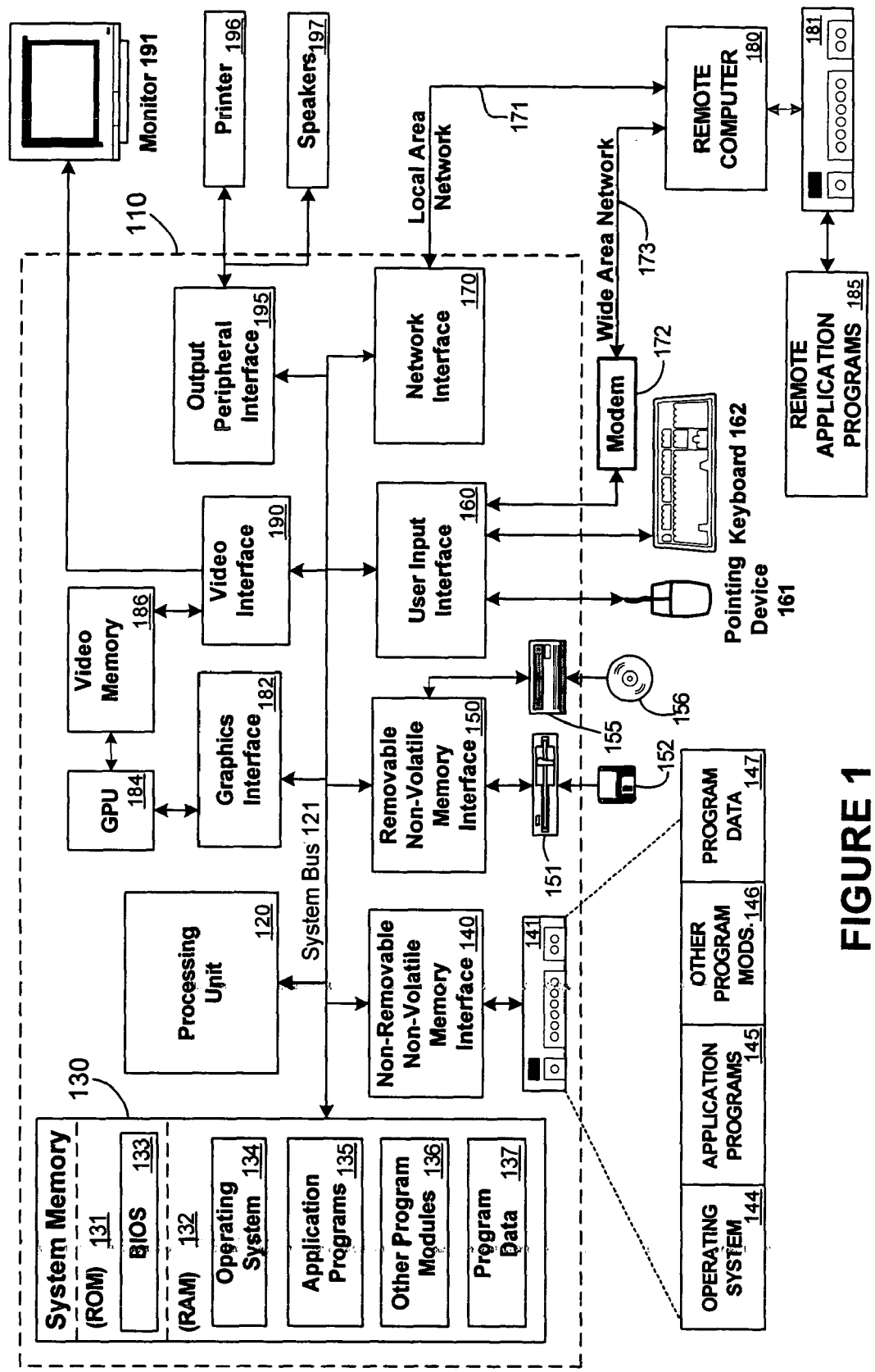
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 10. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of NET's languages and services, and in other distributed computing frameworks as well.

Exemplary Embodiments

Introduction to Web Services

Businesses are more frequently interacting via distributed environments, such as the Internet or World Wide Web. For example, a consumer may want to know the prices of rental cars for an upcoming trip. The consumer may request the prices through an intermediate business on the Internet, such as a travel website. The intermediate business, upon receiving the consumer's request, sends price quote requests to a variety of rental car businesses. After responses are received from the rental car businesses, the intermediate business then sends the responses to the consumer. The consumer may then reserve a car and pay for the reservation via the intermediate business. The business processes discussed above are implemented using messages. For example, the consumer's request to the intermediate business is implemented as an electronic message to the intermediate business that contains the particulars of the proposed car rental, for example: rental dates and times, type of car, additional insurance desired, consumer's name and address, credit card information and/or the like. The intermediate business' price quote request is another message, as are the responses from the rental car businesses—both to the intermediate business from the rental car businesses and from the intermediate business to the consumer—and the reservation ultimately sent by the consumer.

A computer language designed to automate business processes and the messages used to carry out such processes is XLANG/s, which is described in more detail, below. As may be appreciated, it is important that the processes that are implemented using XLANG/s execute properly, and without errors. In addition, such processes should be robust enough to compensate for external errors, such as communications link failures and the like. Providing a method of programming and compiling XLANG/s code to accomplish such processes in a robust and error-free manner is an application of an embodiment of the present invention.

XLANG/s Introduction

XLANG/s is a language that describes the logical sequencing of business processes, as well as the implementation of the business process by using various technology components or services. XLANG/s is described in more detail than is disclosed herein in a document titled "XLANG/s Language Specification," Version 0.55, Copyright© Microsoft 1999–2000, and a document titled "XLANG Web Services For Business Process Design, Satish Thatte, Copyright© Microsoft Corporation 2001, both of which are hereby incorporated by reference in their entirety. The XLANG language is expressed in Extensible Markup Language (XML). As noted above, business processes may be implemented using software code. The XLANG/s language is a modem, domain specific, special purpose language used to describe business processes and protocols. XLANG/s is also a declarative language, which means that it defines an explicit instruction set that describes and implements steps in a business process, the relationship between those steps, as well as their semantics and interactions. XLANG/s code is not just descriptive; it is also designed to be executable. Because of the declarative nature of XLANG/s and its specific semantics, the resulting executable code is deterministic; that is, the behavior of the running business process is well defined by the semantics of the collection of XLANG/s instructions. Therefore, by examining XLANG/s code one is able to determine the business process that is carried out by such code. The definition of such a business process in executable form is an "orchestration."

XLANG/s is compatible with many Internet standards. XLANG/s is designed to use XML, XSLT (http://www.w3.org/TR/xslt), XPATH (http://www.w3.org/TR/xpath), XSD (XML Schema Definition) and WSDL (Web Services Description Language) as supported standards and has embedded support for working with NET based objects and messages. WSDL is described in a document titled "Web Services Description Language (WSDL) 1.1," W3C Note January 2001, by Microsoft and IBM Research, Copyright© 2000 Ariba, International Business Machines Corporation, Microsoft, which is hereby incorporated by reference in its entirety. The XLANG/s language is syntactically similar to C#, thus a C# specification may be referenced as an aid to understanding the exact syntax. The semantics embodied in XLANG/s are a reflection of those defined in a document entitled "Business Process Execution Language for Web Services," Version 1.1, dated Mar. 31, 2003, published by Microsoft, IBM and BEA for the definition of Business Process semantics, which is also hereby incorporated by reference in its entirety. The Business Process Execution Language for Web Services specification is commonly referred to as the "BPEL4WS" specification. As may be appreciated, therefore, the use of XLANG/s is most advantageous when applied to a business process.

XLANG/s defines a rich set of high-level constructs used to define a business process. XLANG/s statements generally fall into one of two categories: simple statements that act on their own, such as receive or send, and complex statements that contain or group simple statements and/or other complex statements. XLANG/s also supports low-level data types such as String and Int32 (integer), for example. High-level data types are also defined such as, for example, messages, ports (locations to which messages are sent and received), correlations and service links. The data types are used to rigorously define the semantics associated with the business process and are complemented by process control statements such as "while," and "scope."

As noted above, a XLANG/s service communicates with the outside world by sending and/or receiving messages. The message type is the structural definition of such a message. Messages are acted upon by operations (e.g., receive, response), and an operation may be either a single asynchronous message or a request-response pair of messages. Operations may be either incoming or outgoing. For example, a seller may offer a service/product that begins an interaction by accepting a purchase order (from a potential buyer) via an input message. The seller may then return an acknowledgement to the buyer if the order can be fulfilled. The seller may send additional messages to the buyer (e.g., shipping notices, invoices). Typically, these input and output operations occur in accordance with a defined sequence, referred to as a service process. The seller's service remembers the state of each purchase order interaction separately from other similar interactions. This is particularly advantageous in situations in which the buyer may be conducting many simultaneous purchase processes with the same seller. Also, each instance of a service process may perform activities in the background (e.g., update inventory, update account balance) without the stimulus of an input operation.

A service process may represent an interaction utilizing several operations. As such the interaction has a well-defined beginning and end. This interaction is referred to as an instance of the service. An instance can be started in either of two ways. A service can be explicitly instantiated using some implementation-specific functionality or a service can be implicitly instantiated with an operation in its behavior that is meant to be an instantiation operation. A service instance terminates when the process that defines its behavior terminates.

Services are instantiated to act in accordance with the history of an extended interaction. Messages sent to such services are delivered not only to the correct destination port, but to the correct instance of the service that defines the port. A port is an end point where messages are sent and received by a service. The infrastructure hosting the service supports this routing, thus avoiding burdening every service implementation with the need to implement a custom mechanism for instance routing.

Figure 2:
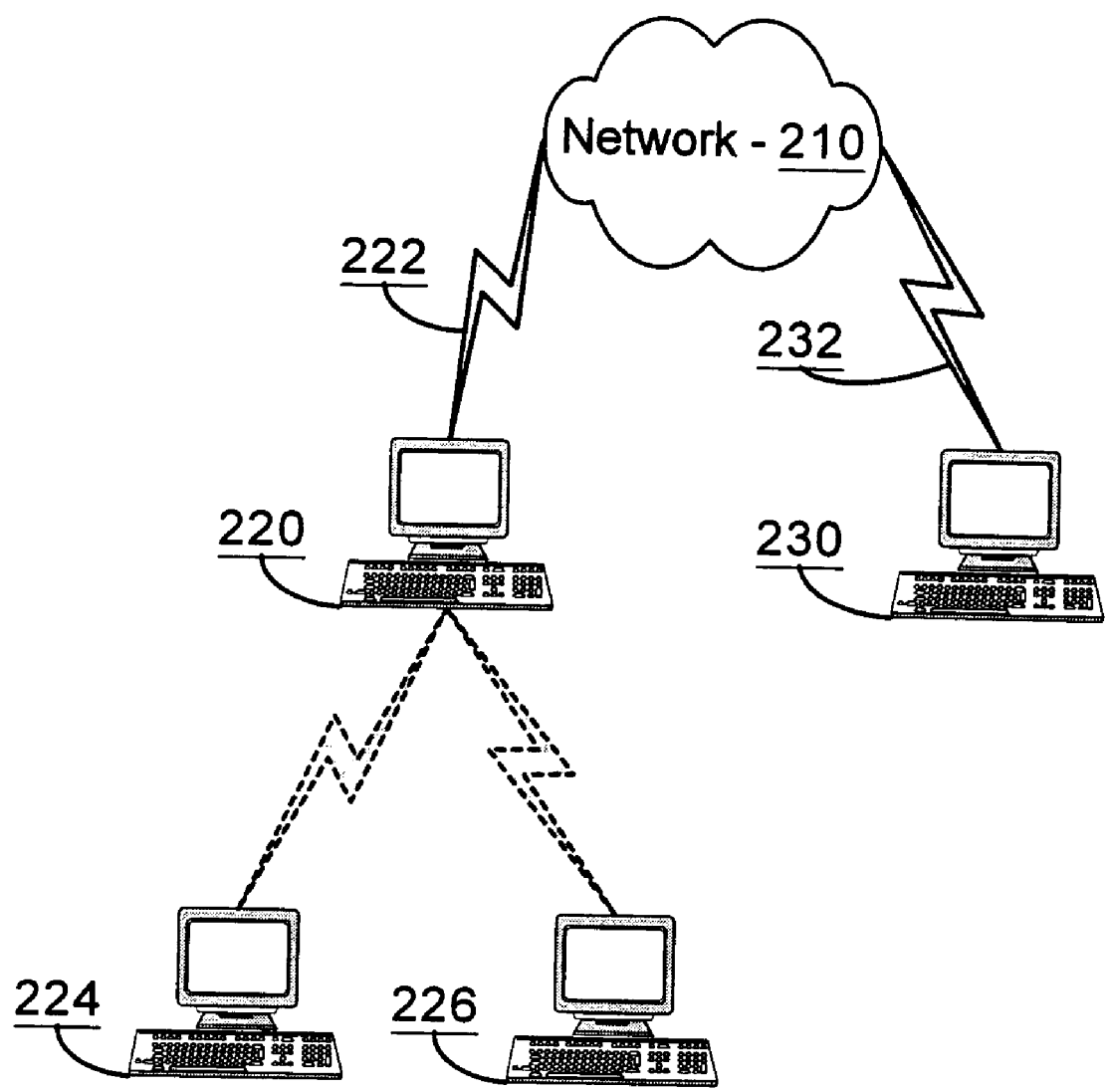
FIG. 2 is a block diagram showing an exemplary networked computing environment in which aspects of the invention may be implemented.

Turning now to FIG. 2, a simplified computer network for enabling communications between two business entities is illustrated. A first computer 220, which is any type of computing device such as, for example, computer 110 as disclosed above in connection with FIG. 1, a special-purpose computer or the like, is operatively connected to a network 210 by way of communications link 222. Network 210 may be any type of network for interconnecting a plurality of computing devices, and may be an intranet, the Internet, etc. Communications link 222 may comprise any type of communications medium, whether wired, wireless, optical or the like Second computer 230, like first computer 220, may be any type of computing device, and is operatively connected to network 210 by way of communications link 232. Communications link 232, like communications link 222, may be any type of communications medium. In one embodiment, communications links 222, 232 are the same type of communications medium, while in another embodiment the medium employed by each communications link 222, 232 is different. Optionally, additional computers 224, 226 may be operatively connected to first computer 220. As may be appreciated, additional computers may be operatively connected to second computer 230 as well (not shown in FIG. 2 for clarity).

For example, consider a typical supply chain situation in which a buyer sends a purchase order to a seller. The buyer sends the message from, for example, first computer 220 to the seller's second computer 230 by way of the network 210 and communications links 222, 233. Assume the buyer and seller have a stable business relationship and are statically configured to send documents related to the purchasing interaction to the URLs associated with the relevant ports. When the seller returns an acknowledgement for the order, the acknowledgement is routed to the correct service instance at the buyer's end at computer 220 or, optionally, another computer such as additional computers 224, 226. One way to implement such a routing is to carry an embedded token (e.g., cookie) in the order message that is copied into the acknowledgement for correlation. The token may be in the message envelope in a header or in the business document (purchase order) itself. The structure and position of the tokens in each message can be expressed declaratively in the service description. This declarative information allows XLANG/s compliant infrastructure to use tokens to provide instance routing automatically.

During its lifetime, a service instance may typically hold one or more conversations with other service instances representing other participants involved in the interaction. Conversations may use a sophisticated transport infrastructure that correlates the messages involved in a conversation and routes them to the correct service instance. In many cases correlated conversations may involve more than two parties or may use lightweight transport infrastructure with correlation tokens embedded directly in the business documents being exchanged. XLANG/s addresses correlation scenarios by providing a very general mechanism to specify correlated groups of operations within a service instance. A set of correlation tokens can be defined as a set of properties shared by all messages in the correlated group. Such a set of properties is called a correlation set.

Description of Embodiments of the Present Invention

Features such as data types, tokens, correlation sets and the like are implemented in XLANG/s code using variables to store values necessary to carry out such features. As is the case with other high-level software languages, XLANG/s is compiled by a compiler prior to run time. Details relating to compilations processes should be known to those of skill in the art and are therefore not described in detail herein. An embodiment of the present invention is carried out as part of an XLANG/s code compilation process, after some steps of the compilation process have completed. For example, it is assumed herein that a programmer has written a textual description of a business process, wherein the textual description conforms to the grammar and specification of the business process language such as, for example, XLANG/s. It is also assumed herein that the textual program is read by a parser, which ensures that the input is well-formed, meaning that there are no textual or syntax errors in the textual representation, and then the parser translates the textual representation into a canonical high-level parse tree representation. Finally, it is assumed herein that the high-level parse tree is analyzed to produce a sequence of low-level abstract instructions. These instructions, when executed in the proper sequence, will perform the actions that the business process writer expressed in the textual representation.

As noted above, the output of the aforementioned steps of the compilation process is a sequence of low-level abstract instructions. The instructions are then used as input for an embodiment of the present invention. As may be appreciated, additional steps or processes may take place prior to initiating an embodiment of the present invention and, likewise, some or all of the above steps may be consolidated. Any such situation is equally compatible with an embodiment of the present invention. An example of the previously-discussed process that results in input for an embodiment is discussed below in connection with FIG. 3. As may be appreciated, the example disclosed herein is abbreviated for the sake of clarity, and in most situations includes a larger amount of textual code and, therefore, a larger parse tree and a longer set of resulting instructions.

First, a textual description of a business process is provided. As noted above, the description preferably conforms to the grammar and specification of the business process language being utilized such as, for example, XLANG/s. It will be appreciated that the description describes the aspects of the business process that will ultimately be carried out by the program that results from the complete compilation process according to an embodiment of the present invention, An exemplary fragment of a textual description of a business process may be, as follows:

```
receive(myPort, msgAmount);
balance = myAccount.Withdraw(msgAmount);
if (balance < 0) {
    msgResult = "overdrawn";
} else {
    msgResult = "okay";
}
send(myPort, msgResult);
```

As may be appreciated, the above fragment is merely exemplary, as a textual description of a business process may describe any aspect of such business process that is capable of being carried out by business software. This particular fragment describes a business process that involves a request to withdraw funds from an account. In particular, and with reference to the above textual description, a message is received on port myPort. The message contains an instruction to withdraw an amount from an account, which is labeled myAccount. If the balance after withdrawal is less than zero, then a result message is assigned the value "overdrawn" to indicate that the account had insufficient funds. Otherwise, the result message is assigned the value "okay." Finally, the result message is sent back to the sender of the original message as a response.

Figure 3:
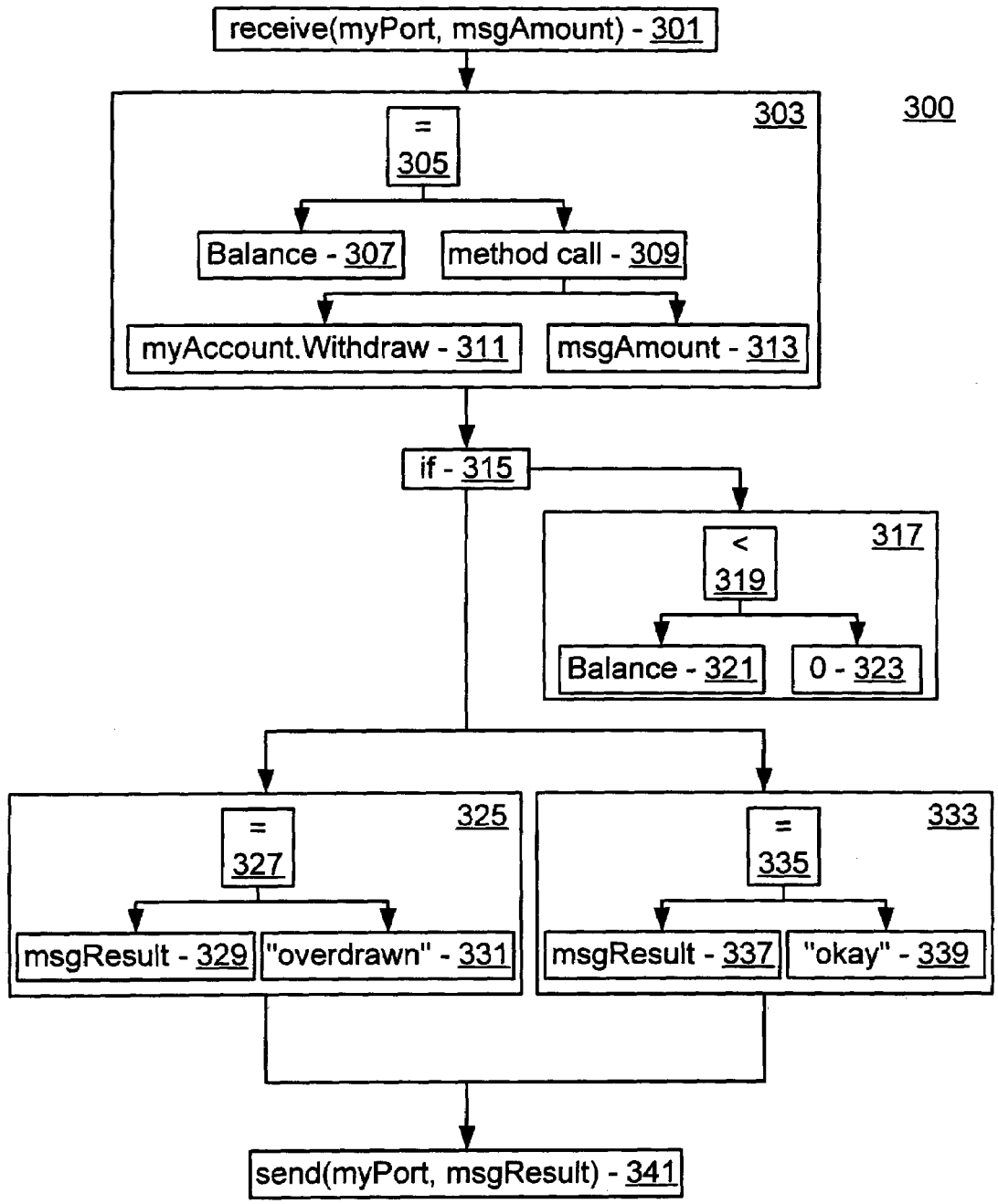
FIG. 3 is a block diagram showing an exemplary parse in accordance with an embodiment of the present invention.

Second, and as noted above, a parser reads the above disclosed textual representation and builds a parse tree that captures the form and structure contained in the text. Turning now to FIG. 3, an exemplary parse tree 300 based on the above textual description is provided. As may be seen in FIG. 3, the logical structure of the textual description becomes evident from the layout of the parse tree 300. It will be appreciated that the parse tree 300 does not need to be graphically created, and may in fact be an ephemeral and internal product created as part of the overall compilation process disclosed herein.

The parse tree 300 comprises blocks that represent the logical structure of the textual description. Block 305, for example, represents the receive(myPort, msgAmount) statement, which then leads to block 303, which in turn represents the balance=myAccount.Withdraw(msgAmount) statement. As can be seen in FIG. 3, the balance=myAccount.Withdraw(msgAmount) statement, being a more logically complex statement than the above receive statement, requires further logical representation within block 303. Blocks 305–313 represent the logic involved with determining the balance of myAccount after withdrawing msgAmount according to the instructions of the textual description. As may be appreciated, the exact graphical representation used to represent the logical structure of a textual description may adhere to any convention, as an embodiment of the present invention is equally compatible with any such convention.

Block 315 represents the "if" portion of the if (balance <0) statement. Block 317, along with blocks 319–323, represents the logic involved with determining whether the balance of myAccount is less than zero, according to the above if (balance <0) statement. Blocks 325 and 333 represent the logic of generating a message according to the result of the determination made in connection with block 317. For example, if the balance determined in block 317 was less than zero, a message is generated according to block 325, and interior blocks 327–331. As may be appreciated, blocks 325–331 represent the msgResult="overdrawn" statement of the above textual description. If the balance determined in block 317 was greater than zero, a message is generated according to block 333, and interior blocks 335–339. As may be appreciated, blocks 333–339 represent the msgResult="okay" statement. Finally, block 341 represents the send(myPort, msgResult) statement, which describes sending a message generated in either blocks 325–331 or blocks 333–339 in accordance with the balance determination of blocks 317–323.

The parse tree is then translated into a sequence of abstract instructions that, when executed, implement the business process.

1) ReceiveInstruction [port=myPort, message=msgAmount]
2) ExpressionInstruction [balance = myAccount.Withdraw(msgAmount)]
3) JumpIfFalseInstruction [if (balance < 0) is false, goto step 6]
4) ExpressionInstruction [msgResult = "overdrawn"]
5) JumpInstruction [goto 7]
6) ExpressionInstruction [msgResult = "okay"]
7) SendInstruction [port=myPort, message=msgResult]

As may be appreciated, the instructions listed above are representative of a list of instructions, as an actual list of instructions may take any form, and any such form is equally consistent with an embodiment of the present invention. In addition, the numbering and parenthetical explanations above, while consistent with an embodiment of the present invention, are not required to be present in abstract instructions that are used in an embodiment of the present invention. As discussed above, the abstract instructions—in whatever form they are presented—are then used as input by an embodiment of the present invention.

Figure 4:
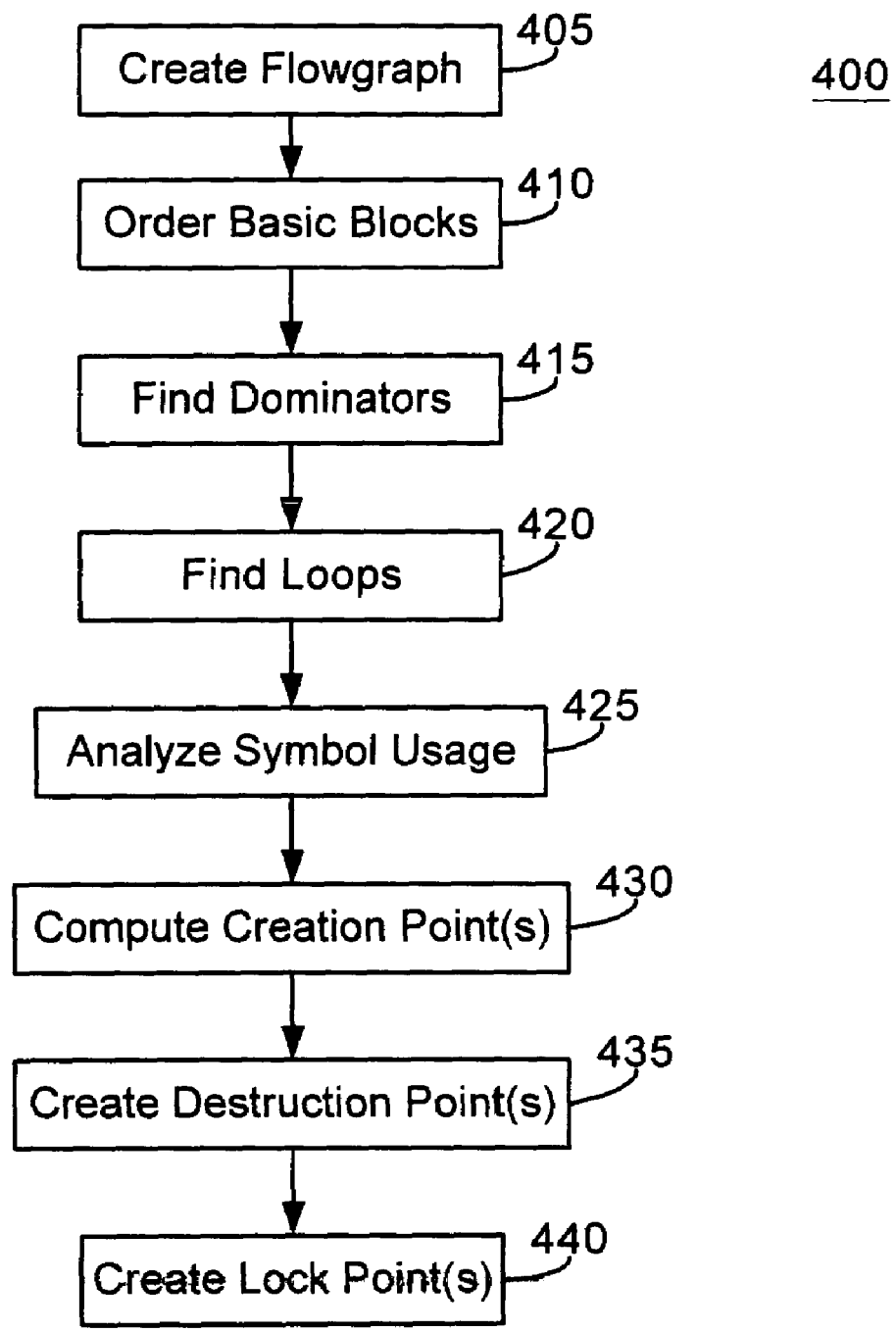
FIG. 4 is a flowchart illustrating an exemplary method of compiling XLANG/s code in accordance with one embodiment of the present invention.

Referring now to FIG. 4, a flowchart illustrating a method of compiling XLANG/s code in accordance with one embodiment of the present invention is shown. As can be seen in FIG. 4, the method 400 comprises steps 405–440 although, and as will be mentioned shortly, not all steps 405–440 need be present in an embodiment of the present invention. At step 405, a flowgraph is created, using abstract instructions such as, for example, the abstract instructions discussed above in connection with FIG. 3. Details regarding the creation of exemplary flowgraphs is discussed below in connection with FIGS. 6A–F. At step 410, the basic blocks of the flowgraph created in step 405 are ordered, and at block 415, dominators of each basic block are found, as will be discussed in detail below in connection with FIG. 7. At step 420, loops are found as will be discussed in detail below in connection with FIG. 8. At step 425, data object usage within each basic block is analyzed. As discussed above, a data object may be a variable, symbol or the like. At step 430, one or more creation points are determined according to the method of FIG. 9, to be discussed in detail below. At step 435, one or more destruction points are determined according to the method of FIG. 10, below. Finally, at step 440, one or more lock points are created for each shared data object, according to the method of FIGS. 11A–B, to be discussed below.

Building the Flowgraph

In one embodiment of the present invention, a flowgraph is constructed by partitioning the instruction list into basic blocks, and then connecting each basic block to its immediate successor(s) and predecessor(s). A basic block is a series of consecutive programming statements, or instructions, in which flow of control enters at the first statement and leaves at the last statement without stopping and without any branching possibilities except at the end of the block. Additional references with respect to basic blocks may be found in *Compilers: Principles, Techniques, and Tools*, by Aho, Sethi and Ullman, which is herein incorporated by reference in its entirety. One exemplary algorithm that is compatible with an embodiment of the present invention is Algorithm 9.1 of *Compilers: Principles, Techniques, and Tools*, by Aho, Sethi and Ullman. Thus, an embodiment of the present invention applies, for example, algorithm 9.1 to abstract instructions 1–7, above. In the above example, therefore, the basic blocks are {1, 2, 3}, {4, 5}, {6} and {7}.

Finding Successors and Predecessors

Once the set of abstract instructions, or "instruction stream," has been partitioned into basic blocks, the blocks are connected bi-directionally to their successors and predecessors. The successors of a first basic block are simply any blocks whose first instructions can be reached by the last instruction in the first basic block. In the above example, therefore, the last instruction in the basic block {1, 2, 3} is the JumpIfFalse instruction. This instruction is defined to perform a jump to another instruction if the condition is false; otherwise, the next sequential instruction will be processed. Thus, the successors of {1, 2, 3} are {4, 5} and {6}. Predecessors, as the name implies, are the opposite of successors. As a result, in the present example the predecessor of {4, 5} is {1, 2, 3}.

Figure 5:
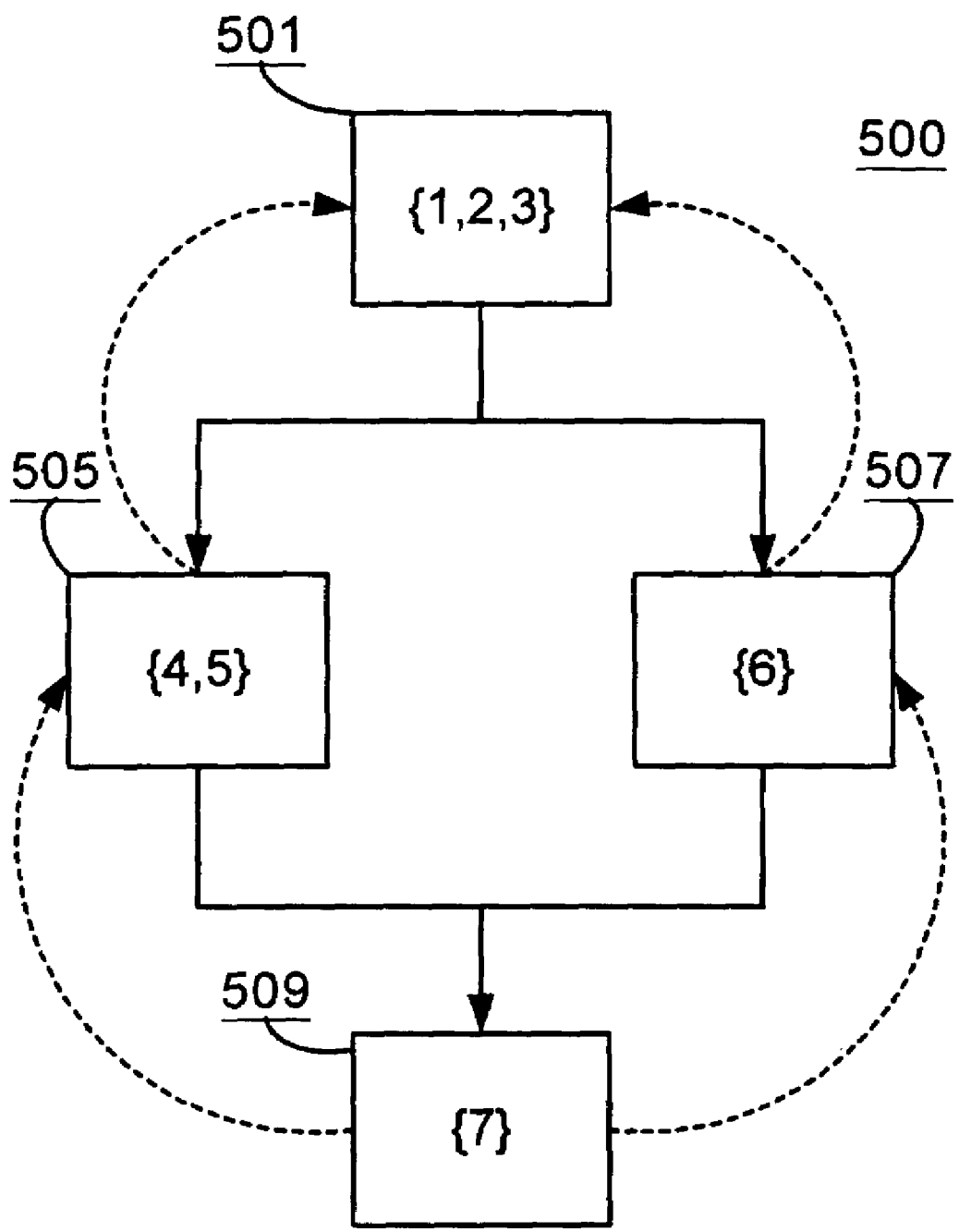
FIG. 5 is a block diagram showing an exemplary flowgraph abstract instructions in accordance with one embodiment of the present invention.

Turning now to FIG. 5, an exemplary flowgraph 500 of the abstract instructions listed above is illustrated. Block 501 represents basic block {1, 2, 3}, block 505 represents basic block {4, 5}, block 507 represents basic block {6} and block 509 represents basic block {7}). The solid lines represent the successor relationships between each basic block, and the dashed lines represent the predecessor relationships. For example, blocks 505 and 507 are each connected by solid lines to block 509, thereby indicating that basic block {7} is a successor to basic blocks {4, 5} and {6}. Likewise, block 509 is connected to blocks 505 and 507 by a dashed line, thereby indicating that basic blocks {4, 5} and {6} are predecessors to basic block {7}.

Flowgraphs for Transactions

A transaction in XLANG/s encapsulates a sub-process that exhibits transactional characteristics. Thus, a process contained within a XLANG/s transaction either completes in its entirety, or fails in its entirety. As may be appreciated, planning for the success or failure of a particular XLANG/s transaction allows a programmer to create a business application that is robust enough to compensate for errors. A transaction may be, for example, atomic or long-running.

An atomic XLANG/s transaction is a software transaction in which no action takes place and no program state is changed unless the transaction successfully completes. It is atomic in the sense that it completes successfully or it does nothing at all, which is to say that it does not "commit." A long-running XLANG/s transaction is, as the name implies, a software transaction that takes place over a period of time that is significant for computing purposes. At any point during the processing of such a transaction, an exception may occur. When an exception occurs in, or is "thrown from," a long-running transaction, the compiler cannot be certain of which, if any, of the instructions within the transaction have executed successfully.

Regardless of its type, each transaction comprises a body process, zero or more exception handler processes and an optional compensation process. As may be appreciated, an atomic transaction does not have an exception handler; however, an atomic transaction may be retry-able. An exception handler process is a sub-process that executes whenever any instruction in the transaction body throws an exception of the kind for which the handler is designed, or whenever the transaction aborts. A compensation process is a sub-process that might execute, depending on the configuration of the program, after a transaction commits in order to "undo" the work that was performed in the transaction body. As may be appreciated, therefore, in one embodiment transactions can nest, and if an inner transaction commits, but an outer transaction aborts, the outer transaction can invoke the inner transaction's compensation handler.

Discussed below in connection with FIGS. 6A–F are several case examples to further illustrate transaction flowgraphs in accordance with an embodiment of the present invention. In connection with such discussion, the notation $P_x$ is used to denote a sub-process. In this notation, the subscript x is an identifier of the sub-process P. For clarity, it is assumed herein in connection with FIGS. 6A–F that all sub-processes consist of a single basic block, although it will be appreciated that an embodiment of the present invention may be implemented to process arbitrarily complex sub-processes. Likewise, it will also be appreciated that the code examples to be used below in connection with FIGS. 6A–F are merely exemplary, as code used in connection with an embodiment of the present invention may be of any length or complexity.

Long Running Transaction

The simplest form of XLANG/s transaction is a long-running transaction with no exception handlers and no compensation. A textual description of such a transaction may, for example, consist of the following high-level code:

```
P_start
scope longrunning transaction LRT {
  body {
    P_body
  }
}
P_end
```

This, in turn, produces the following abstract instruction stream:

| | |
|---|---|
| 1) | { $P_{start}$ } |
| 2) | BeginTransaction [body @ step 3] |
| 3) | { $P_{body}$ } |
| 4) | CommitTransaction [resume to step 5] |
| 5) | { $P_{end}$ } |

Again, and as noted above, this abstract instruction stream consists of numbering and bracketed comments, which are inserted herein for ease of discussion. Thus, such numbering and comments, while consistent with an embodiment of the present invention, are not required. The special abstract instruction BeginTransaction has as its successors the transaction body process, $P_{body}$ and, if any were present in the present example, all exception handler processes. The special abstract instruction CommitTransaction has as its successors the next sequential instruction and, if one were present in the present example, the transaction's compensation process.

Figure 6A:
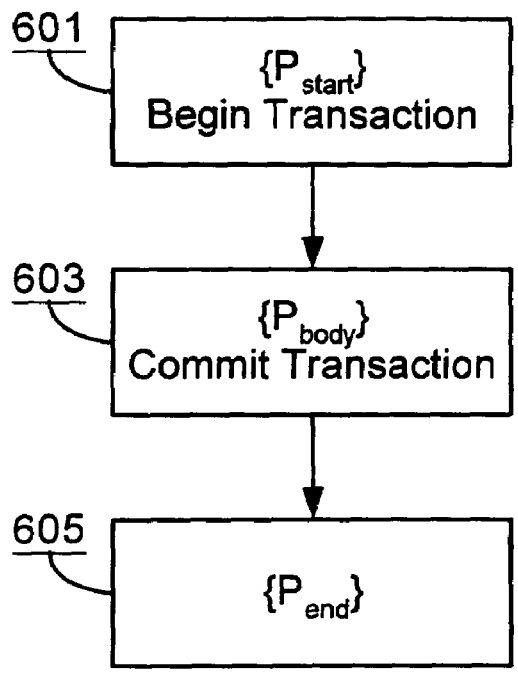
FIGS. 6A–F are block diagrams showing exemplary flowgraphs of basic blocks in accordance with one embodiment of the present invention.

Because the above two special abstract instructions generally interrupt the straight-line execution of the program by causing a jump or branch to an instruction in another area of the code, such abstract instructions mark the end of a basic block. Thus, the above fragment has three basic blocks: {1, 2}, {3, 4} and {5}. Turning now to FIG. 6A, a flowgraph of the above-described basic blocks is illustrated. Block 601 represents the abstract instruction BeginTransaction, as indicated by the $P_{start}$ instruction, block 603 represents the abstract instruction CommitTransaction, as indicated by the $P_{body}$ instruction and block 605 represents the end of the transaction, as indicated by $P_{end}$. The arrows indicate the program flow, which is from block 601 through block 603 to block 605. It will be appreciated that in the present simple example it is not necessary for an embodiment of the present invention to split the flowgraph into three blocks 601–605 because the instructions are processed in order without any branching or compensation.

Atomic Transaction

The present example illustrates how an embodiment may treat an atomic transaction differently than a long-running transaction. As may be appreciated, the textual description below is similar to that of the long-running transaction discussed above in connection with FIG. 6A.

$P_{start}$
scope atomic transaction AT {
  body {
    $P_{body}$
  }
}
$P_{end}$ This, in turn, produces the following abstract instruction stream, which is also to that of the long-running transaction discussed above in connection with FIG. 6A.

1) { $P_{start}$ }
2) BeginTransaction [body @ step 3]
3) { $P_{body}$ }
4) CommitTransaction [resume to step 5, retry to step 2]
5) { $P_{end}$ }

Figure 6B:
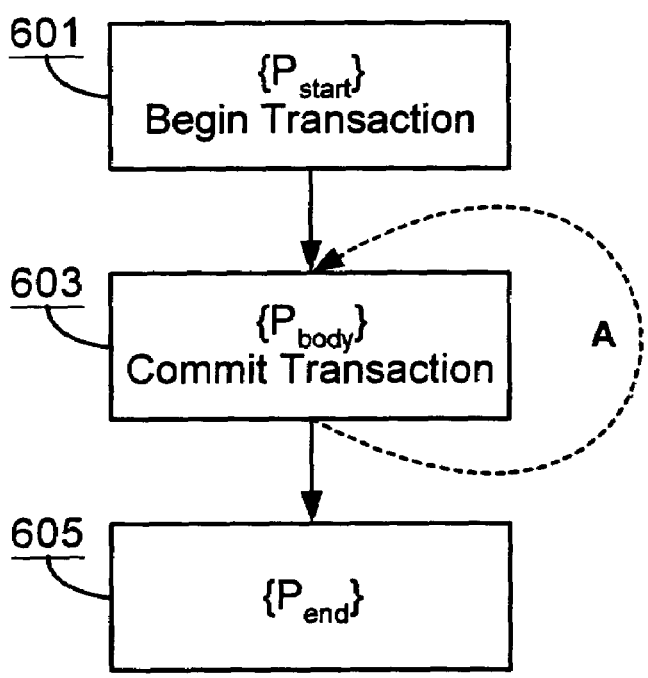

In the present atomic transaction example, the CommitTransaction comprises slightly different instructions than that was described above in connection with FIG. 6A. If the transaction commits, the control flow proceeds to the next sequential instruction and if it aborts, the control flow loops back to the start of the transaction. As may be appreciated, therefore, an atomic transaction forms an implicit loop because it can retry on failure. Turning now to FIG. 6B, a flowgraph of the above-described transaction is illustrated. As was the case in FIG. 6A, block 601 represents the abstract instruction BeginTransaction, as indicated by the $P_{start}$ instruction, block 603 represents the abstract instruction CommitTransaction, as indicated by the $P_{body}$ instruction and block 605 represents the end of the transaction, as indicated by $P_{end}$. The unlabeled arrows indicate the normal, failure-free program flow, which is from block 601 through block 603 to block 605. Arrow A indicates the implicit loop formed by the CommitTransaction instruction as explained above.

As may be appreciated, accounting for the implied loop, as represented by dashed arrow A, is very important when determining destroy points and the like with respect to data objects that are affected by the loop. For example, if the last lexical use of a data object v occurs in the transaction body $P_{body}$, the data object v cannot be destroyed until the transaction commits. If data object v was destroyed in $P_{body}$ and if the transaction aborted and retried, the value of the program object v would be lost during the retry. Accordingly, the presence of the implicit loop is accounted for during the determination of destruction points as will be discussed below in connection with FIG. 10. In the present example, an embodiment of the present invention would move the destruction of v into the basic block containing $P_{end}$.

Long-Running Transaction with Exception Handler

Figure 6C:
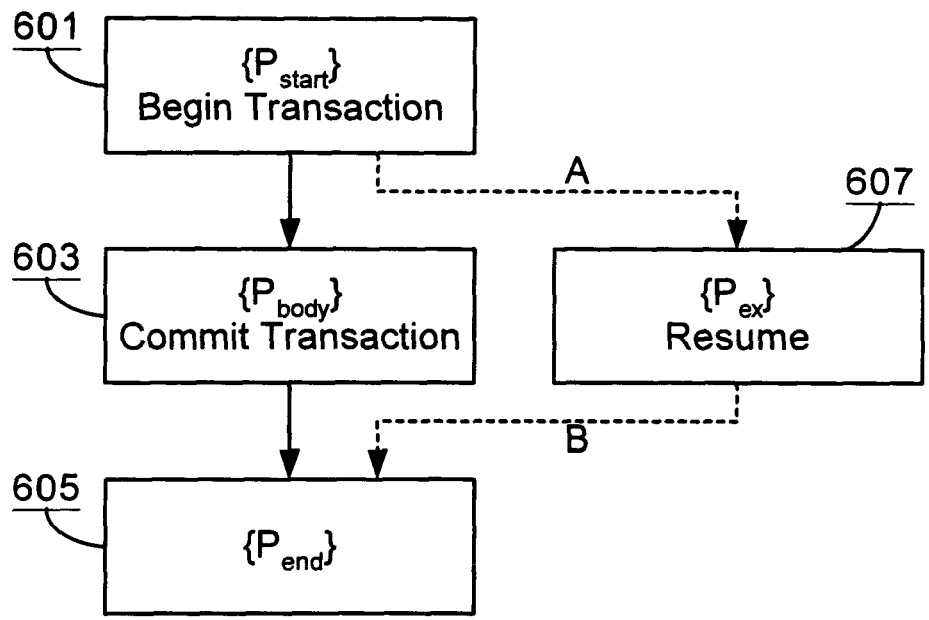

The present example illustrates the handling of an XLANG/s exception handler as implemented in a long-running transaction. As discussed above, atomic transactions do not have exception handlers. A textual description of such a transaction may, for example, consist of the following high-level code:

$P_{start}$
scope longrunning transaction LRT {
  body {
    $P_{body}$
  }
  exceptions {
    catch {
      $P_{ex}$
    }
  }
}
$P_{end}$ Turning directly to FIG. 6C, and omitting the abstract instruction stream in the present example for clarity, a flowgraph of the above-described transaction is illustrated. Again, and as was the case in FIGS. 6A and 6B, block 601 represents the abstract instruction BeginTransaction, as indicated by the $P_{start}$ instruction, block 603 represents the abstract instruction CommitTransaction, as indicated by the $P_{body}$ instruction and block 605 represents the end of the transaction, as indicated by $P_{end}$. In addition, block 607 represents the abstract instruction Resume, which is associated with the exception handler, as will be discussed shortly. The unlabeled arrows again indicate the normal, failure-free program flow, which is from block 601 through block 603 to block 605.

The flowgraph presumes that an exception can occur immediately after the transaction body is entered; thus, both the body and the exception handler can logically follow the BeginTransaction abstract instruction. The unlabeled, solid arrow following block 601 indicates normal program flow, while dashed arrow A indicates the logical path that is taken in the event of an exception. Block 607 contains the special abstract instruction Resume, which is defined to jump to the next statement after the transaction. Thus, upon completing the processing of the exception handler represented by block 607, the logic path indicated by dashed arrow B is taken to $P_{end}$ at block 605. As may be appreciated, both the body of block 603 and the exception handler of block 607 flow to the same successor, $P_{end}$ at block 605.

Long Running Transaction with Compensation

The present example illustrates the handling of a XLANG/s compensation handler as implemented in a long-running transaction. As discussed above, compensation handlers are XLANG/s code modules that attempt to undo, or "compensate" for, a transaction that does not complete successfully due to an error or the like. Such a compensation handler may perform any task desired by a programmer such as, for example, performing a function that is the opposite of the failed transaction, performing a function that nullifies the effect of the failed transaction, or the like. A textual description of such a transaction may, for example, consist of the following high-level code:

```
P_start
scope longrunning transaction LRT {
    body {
        P_body
    }
    compensation {
        P_comp
    }
}
P_x
P_end
```

Figure 6D:
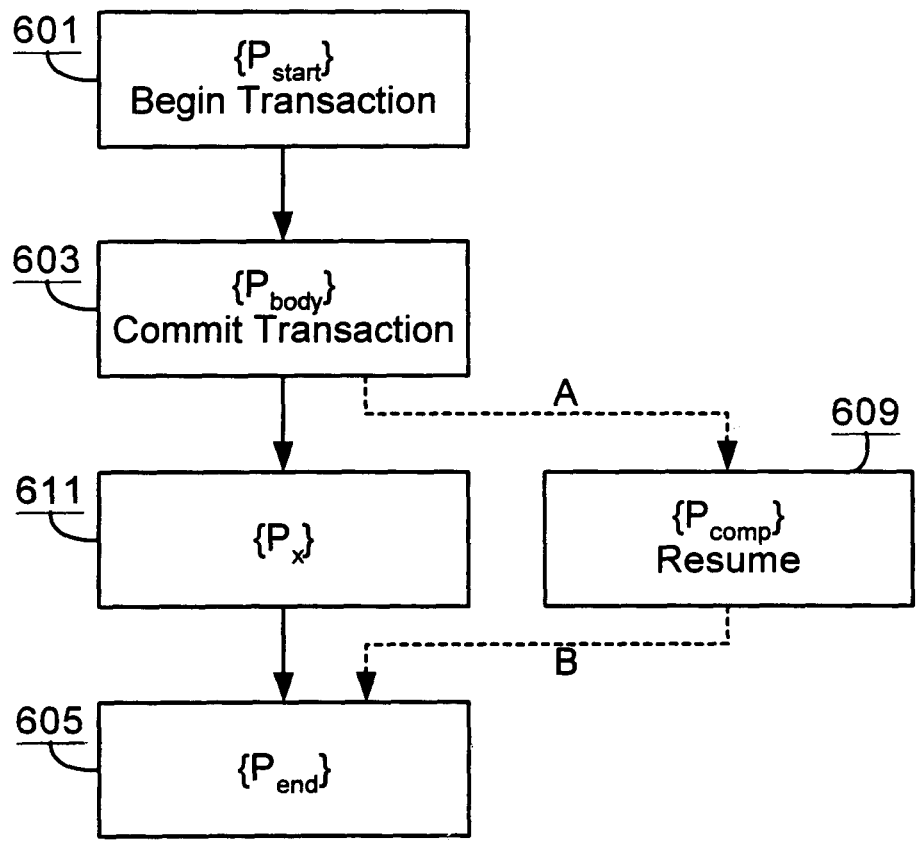

Turning now to FIG. 6D, a flowgraph of the above-described transaction is illustrated. Again, and as was the case in FIGS. 6A–C, block 601 represents the abstract instruction BeginTransaction, as indicated by the $P_{start}$ instruction, block 603 represents the abstract instruction CommitTransaction, as indicated by the $P_{body}$ instruction and block 605 represents the end of the transaction, as indicated by $P_{end}$. Block 609 represents the compensation process and the abstract instruction Resume, which was discussed above in connection with FIG. 6C. Block 611 represents any additional programming that follows $P_{body}$, as indicated by $P_x$. The unlabeled arrows again indicate the normal, failure-free program flow, which is from block 601 through blocks 603 and 611 to block 605.

Dashed arrow A represents the logical path taken in the event of a program state for which compensation is desired. As can be seen in FIG. 6D, block 609 represents a compensation handler, as indicated by $P_{comp}$. It will be appreciated that the placement of block 609 in the flowgraph of FIG. 6D illustrates that the code of the compensation block can be reached after the transaction successfully commits, and remains reachable until the end of the program, as represented by block 605. Such availability of block 609 is achieved in the flowgraph of FIG. 6D by making block 609 a possible successor of the CommitTransaction instruction of block 603, by way of dashed arrow A, and by making the end of the program, block 605, the successor of block 609, by way of dashed arrow B. As may be appreciated, in one embodiment the compensation block 609 could flow to an earlier point in the program than block 605, provided that the compensation functionality represented by block 609 is no longer needed at the point to which block 609 flows.

Atomic Transaction with Compensation

Figure 6E:
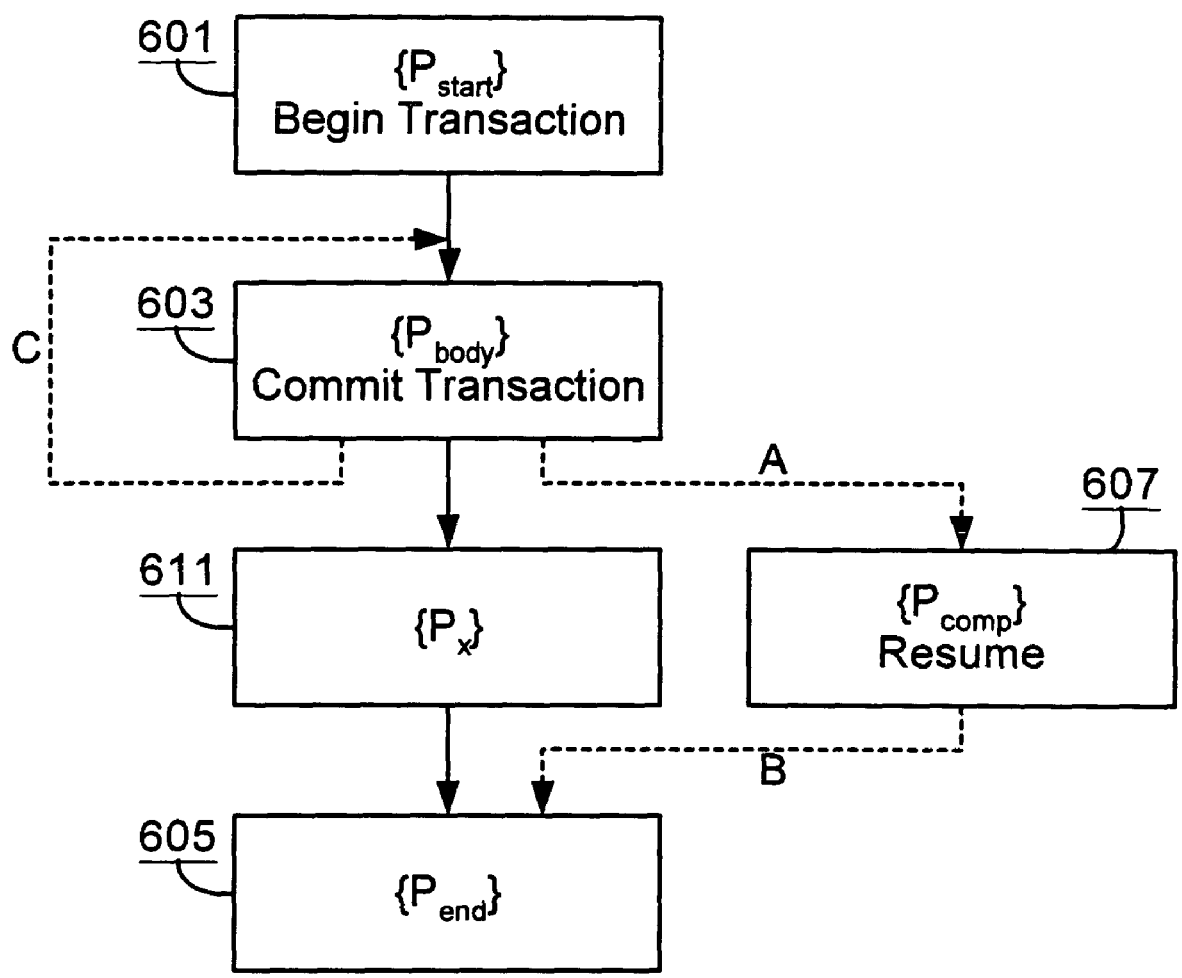

The flowgraph of an atomic transaction with compensation, as may be appreciated, may be described as a combination of the atomic transaction discussed above in connection with FIG. 6B with the long-running transaction with compensation discussed above in connection with FIG. 6D. Turning now to FIG. 6E, such a flowgraph is illustrated. The description of blocks 601–611, solid unlabeled arrows and dashed arrows A and B, is consistent with that discussed above in connection with FIG. 6D. As may be appreciated, dashed arrow C is equivalent to dashed arrow A as discussed above in connection with FIG. 6B, which represents the implicit loop that can retry on failure of the CommitTransaction abstract instruction.

Long Running Transaction with Exception Handler and Compensation

Figure 6F:
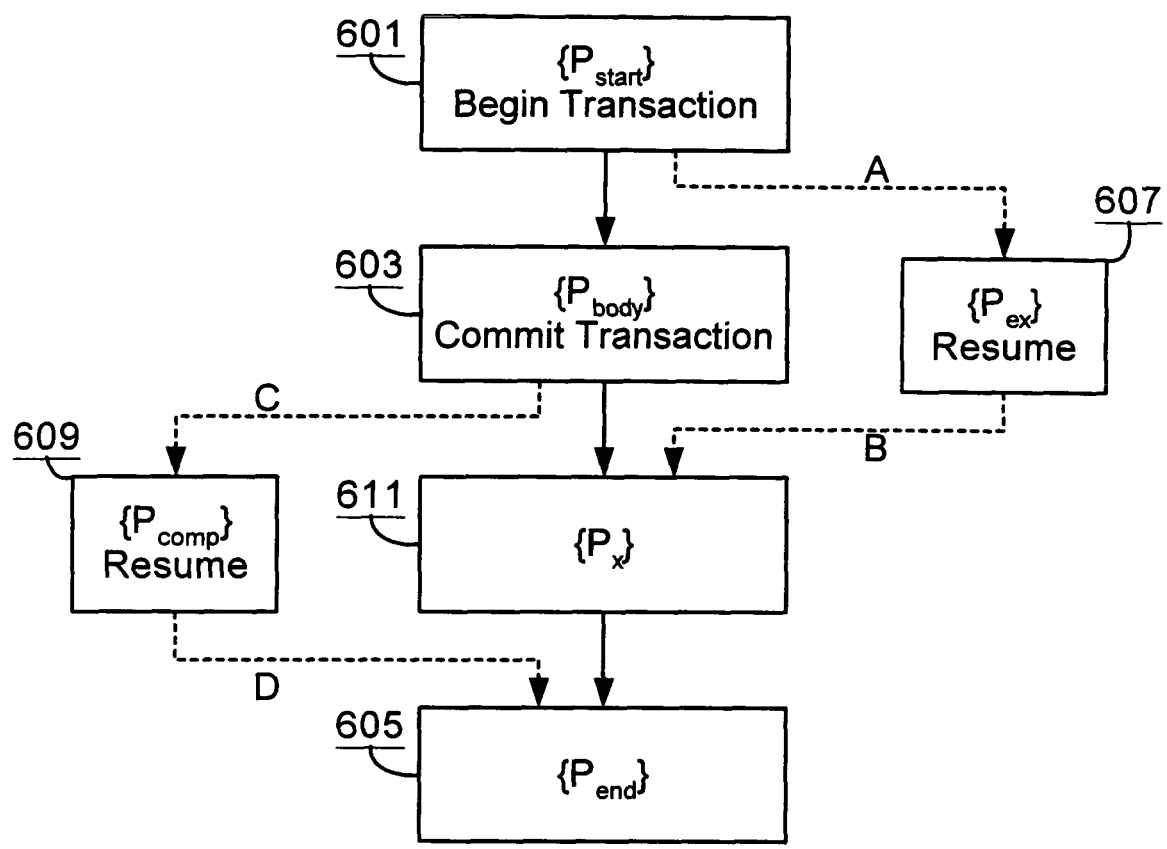

The flowgraph of a long-running transaction with exception handler and compensation, as may be appreciated, may be described as a combination of the long-running transaction with exception handler discussed above in connection with FIG. 6C with the long-running transaction with compensation discussed above in connection with FIG. 6D. Turning now to FIG. 6F, such a flowgraph is illustrated. The description of blocks 601–611 and the solid unlabeled arrows are consistent with that discussed above in connection with FIG. 6E. As may be appreciated, dashed arrows A and B are equivalent to dashed arrows A and B as discussed above in connection with FIG. 6C, which represents the control flow in the event of an exception, whereby the control flow passes to the exception handler of block 607 by way of dashed arrow A, and returns to the program at block 611. As may also be appreciated, dashed arrows C and D are equivalent to dashed arrows A and B as discussed above in connection with FIG. 6D, which represents the control flow in the event the compensation handler of block 609 is invoked, which occurs by way of dashed arrow C, and whereby control flow returns to the end of the program at block 605 by way of dashed arrow D.

Preparing the Flowgraph

As may be appreciated, once a flowgraph such as, for example, one or more of the flowgraphs as described above in connection with FIGS. 6A–F, is created, an embodiment of the present invention may then annotate information onto each basic block. According to one embodiment of the present invention, a depth-first search is undertaken to assign a number indicating a position of a basic block in a depth-first ordering of the flow graph. In addition, in an embodiment a determination of two dominator sets is made. In such a determination, a set of dominators from above is made, as well as a set of dominators from below. Furthermore, in an embodiment a determination of which, if any, blocks participate in one or more loops is also made.

As may also be appreciated, an embodiment of the present invention may create flowgraphs, such as those discussed above in connection with FIGS. 6A–F, for any level of abstract instruction complexity. For example, any combination of any number of flowgraphs of FIGS. 6A–B may be combined in series and/or in parallel. In such a manner, an embodiment of the present invention is able to process and compile code of any complexity.

Depth-First Ordering

According to an embodiment, a depth-first search is performed on the flow graph and each block contained within the flowgraph is assigned a corresponding depth-first number. As may be appreciated, any algorithm for finding a depth-first ordering of a flowgraph is equally consistent with an embodiment of the present invention. For example, one such algorithm is algorithm 10.14, as described in *Compilers: Principles, Techniques, and Tools.*

Figure 7:
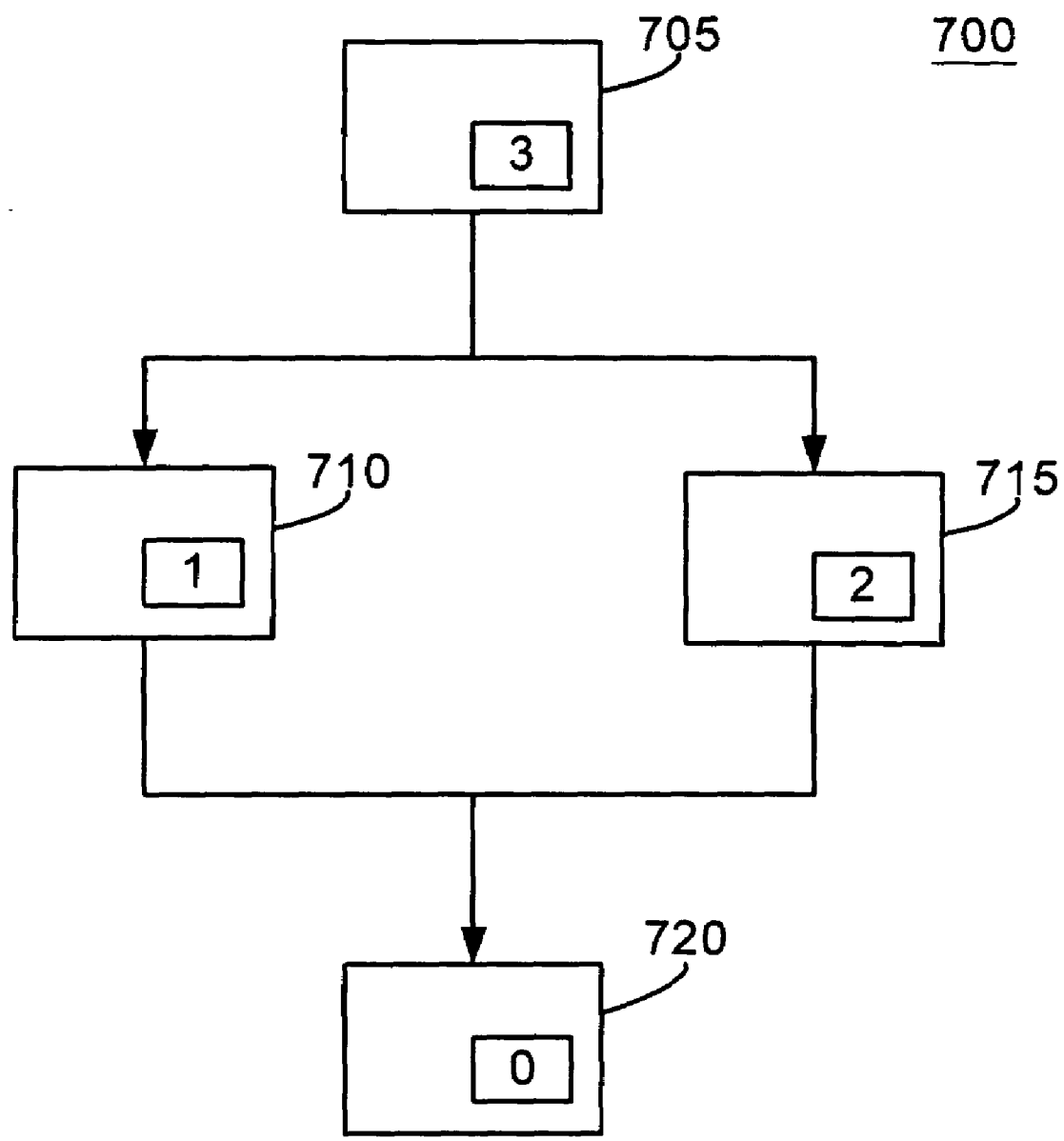
FIG. 7 is a block diagram showing an exemplary flowgraph having depth-first numbers assigned to each basic block in accordance with one embodiment of the present invention.

It will be appreciated that the nature of a depth-first search ensures that the last basic block in the program, which corresponds to the end of the program, receives the lowest number, while the first basic block in the program, which corresponds to the start of the program, receives the highest number. Referring now to FIG. 7, an exemplary flowgraph having depth-first numbers assigned to each basic block is illustrated. Flowgraph 700 comprises blocks 705–720, each of which is assigned a depth-first number. Starting at the bottom of flowgraph 700, at block 720, it can be seen that block 720, being at the end of the program represented by flowgraph 700, has been assigned a number of 0. Blocks 710 and 715, being the next two blocks from the end of flowgraph 700 are assigned a number of 1 and 2, respectively. As may be appreciated, because blocks 710 and 715 are at an equal distance from the end of flowgraph 700, the assignment of numbers 1 and 2 may be reversed while remaining consistent with an embodiment of the present invention. Finally, block 705, being the furthest from the end of flowgraph 700, is assigned a number of 3. As may also be appreciated, the use of depth-first ordering permits the efficient identification of the basic blocks 705–720 such as, for example, as one or more bit sets.

Finding Dominators

The dominance relationships of all blocks 705–720 are determined bi-directionally using, for example, algorithm 10.16, as described in *Compilers: Principles, Techniques, and Tools*. As noted above, any algorithm for finding dominators of basic blocks is equally consistent with an embodiment of the present invention.

Determining whether a block pre-dominates another block involves starting at the top—representing the beginning of the control flow—of flowgraph 700 and determining if all logic paths leading to a particular block must have first passed through a previous block. For example, in flowgraph 700, the pre-dominators of block 720 are 720 and 705. It will be appreciated that a block dominates itself. It will also be appreciated that blocks 710 and 715 do not pre-dominate block 720 because control flow does not need to pass through either block 710 or 715 prior to reaching block 720. For example, control flow may pass from block 705 to block 710 and then to 720, bypassing block 715. Likewise, control flow may pass from block 705 to block 715 and then to 720, bypassing block 710.

Determining whether a block post-dominates another block involves starting at the bottom—representing the end of the control flow—of flowgraph 700 and determining whether all paths leading from a particular block must ultimately pass through another block. For example, in flowgraph 700 the post-dominators of block 705 are blocks 705 and 720.

Finding Loops

Figure 8:
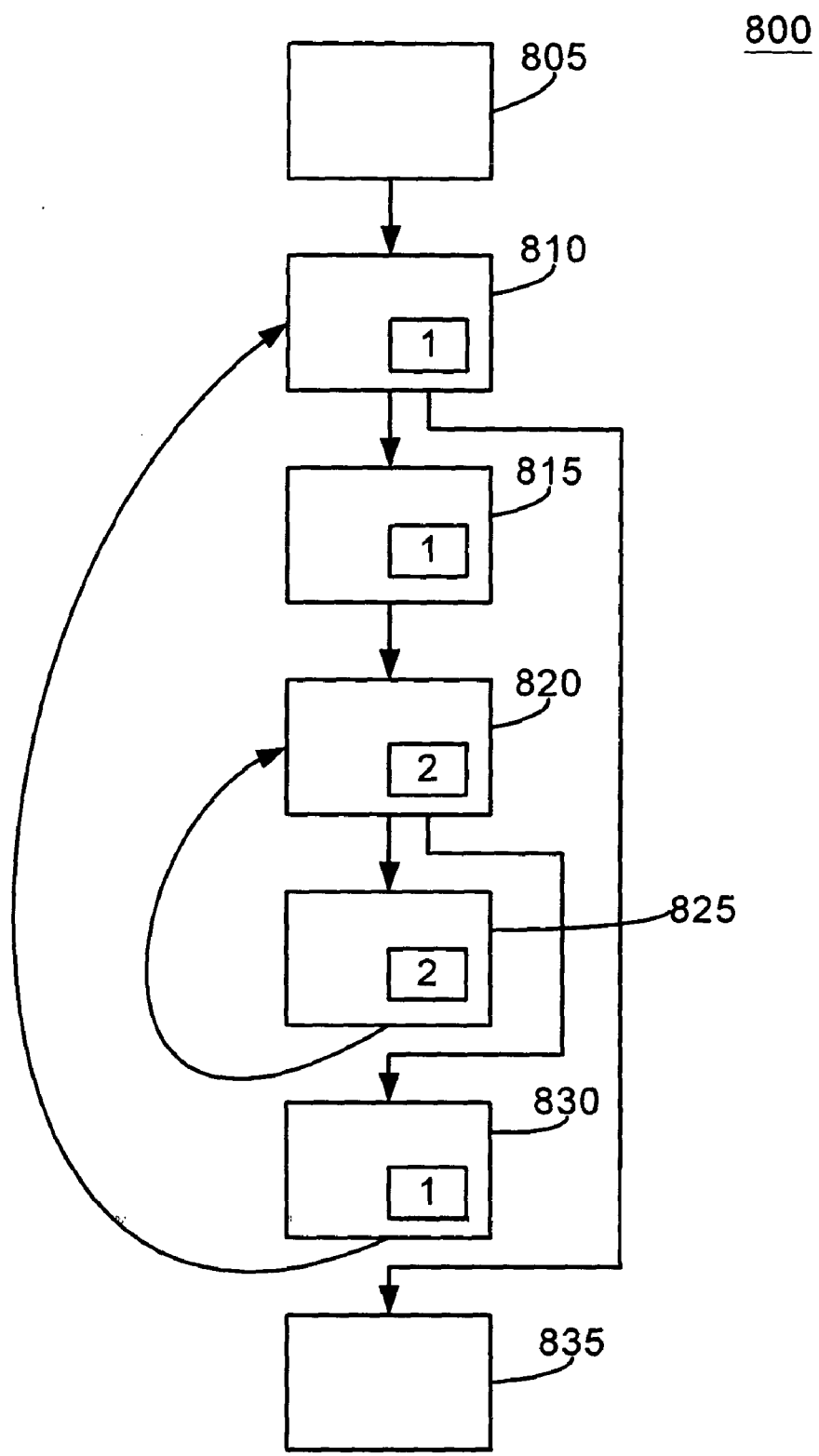
FIG. 8 is a block diagram showing an exemplary flowgraph having loops assigned in accordance with one embodiment of the present invention.

Referring now to FIG. 8, an embodiment of the present invention locates and identifies loops in flowgraph 800 by using, for example, algorithm 10.1, as described in *Compilers: Principles, Techniques, and Tools*. As can be seen in FIG. 8, flowgraph 800 is a doubly-nested loop. As noted above, an embodiment of the present invention is equally consistent with flowgraphs 800 of any complexity or number of loops. A numbering convention is used to identify each loop such as, for example, that all basic blocks belonging to the same loop are given the same loop identifier. The loop identifier may be any type of identifier such as, for example, an integer with the property that inner loops have higher numbers than outer loops. In FIG. 8, it can be seen that blocks 805 and 835 are not part of a loop, and therefore are not given a loop identifier. It can also be seen that the loop formed between blocks 820 and 825 is nested within a loop formed by blocks 810, 815 and 830. Therefore, according to one embodiment of the present invention blocks 820 and 825 are assigned a loop identifier of 2, to signify that blocks 820 and 825 participate in two loops, and blocks 810, 815 and 830 are assigned a loop identifier of 1, to signify that blocks 810, 815 and 830 participate in one loop.

Analyzing Data Object Usage

Thus, at the completion of step 420 of FIG. 4, as described in detail above in connection with FIG. 8, the method according to one embodiment of the present invention proceeds to step 430, which is to analyze the usage of each data object. As was discussed above, data objects may be, for example, variables, data objects and the like. Once the flowgraph such as, for example, flowgraph 800 of FIG. 8 or the like, has been prepared, a pass is made through the flowgraph. Within each basic block of the flowgraph, the abstract instructions are examined to determine which program object is being used, and how such object is being used. Each program object S therefore contains two sets: the set $S_{read}$ of basic blocks that read from such object, and the set $S_{write}$ of basic blocks that write to the object. As may be appreciated, the set $S_{use}$ of basic blocks that read or write from an object is formed simply from $S_{read} \cup S_{write}$.

As discussed above in connection with FIGS. 4 and 6A–F, the flowgraphs produced by an embodiment of the present invention are used by a XLANG/s compiler to perform several tasks. For example, the calculation and insertion of create, destroy and lock points are some of the tasks that may be performed by an embodiment of the present invention, and are now discussed in detail below in connection with FIGS. 9–11B.

Computing the Creation Point for an Object

Figure 9:
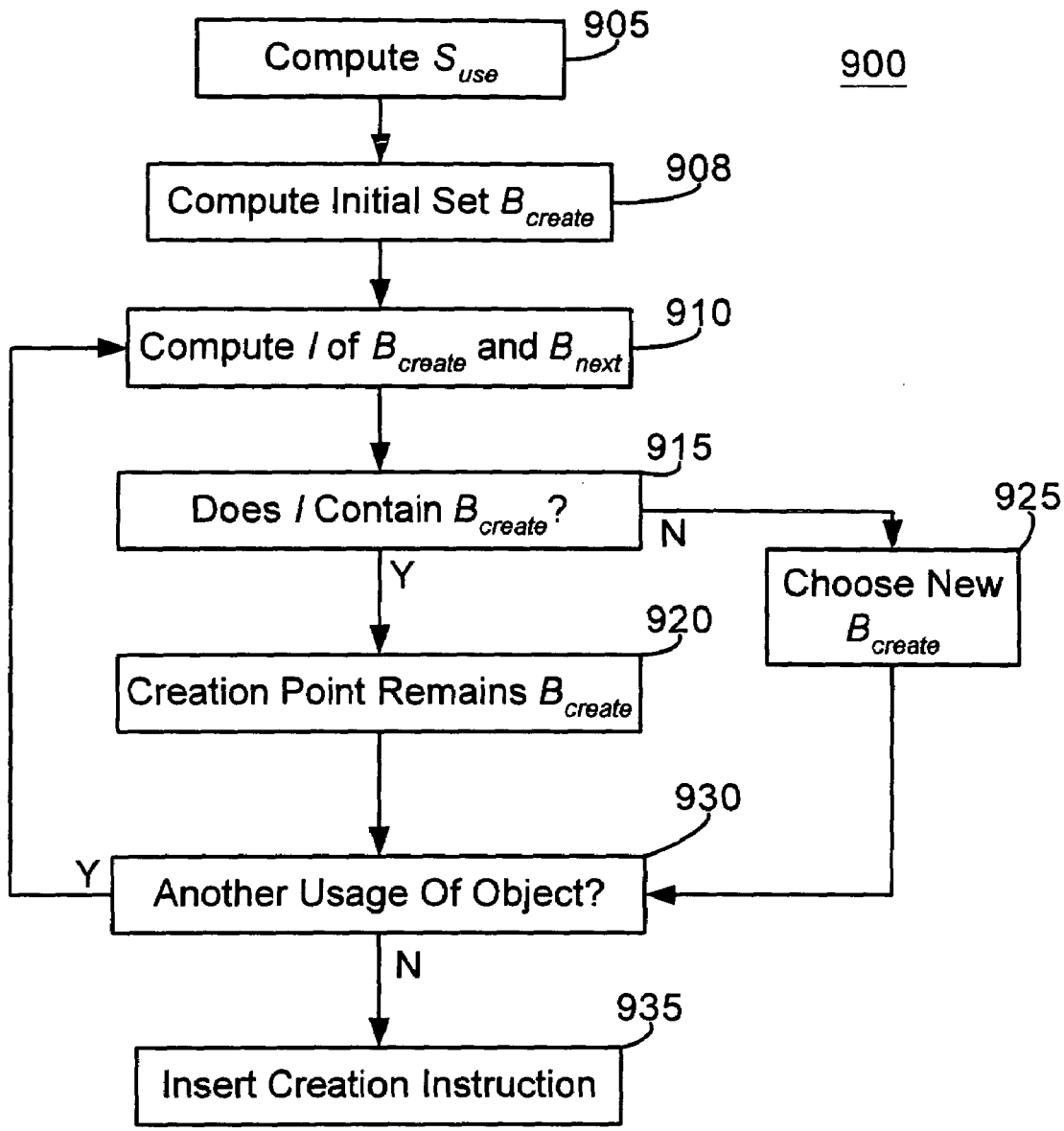
FIG. 9 is a flowchart illustrating an exemplary method of computing one or more creation points for a data object in accordance with one embodiment of the present invention.

Turning now to FIG. 9, a method 900 of computing one or more creation points for a data object is illustrated. At step 905, a set $S_{use}$ of basic blocks that either read from or write to a data object is collected. As may be appreciated, the set $S_{use}$ is equal to the sum of a set of basic blocks that read from a data object, $S_{read}$, and the set of basic blocks that write to a data object, $S_{write}$. It will be appreciated that an assumption may be made that the data object of interest is created at the first lexical use of the data object within the set $S_{use}$. Thus, the basic block that contains the first lexical use of the data object is referred to herein as $B_{create}$. This is, for example, the highest-numbered basic block that refers to the data object because, as noted above in connection with FIG. 7, depth-first ordering gives higher numbers to basic blocks near the start of a program. Every lexically subsequent usage of the data object within $S_{use}$, in one embodiment, is each subsequently lower-numbered basic block, $B_{next}$. Accordingly, at step 908 an initial set $B_{create}$ is computed, based on the first lexical use of the data object.

At step 910, a compiler according to an embodiment of the present invention computes the intersection I of $B_{create}$'s pre-dominators and $B_{next}$'s pre-dominators. At step 915, a determination is made as to whether the set I contains $B_{create}$. If so, at step 920 the creation point of the data object of interest remains $B_{create}$. If not, at step 925 a new creation point $B_{create}$ is chosen from the set I, such that the depth-first number of the new creation point is the smallest number that is greater than the depth-first number of the current creation point. As a result, therefore, the creation point of the data object occurs before such data object is used so as to avoid an error that would result if the object was referred to and had no value. Likewise, the creation point is created as close to the first use of the object as possible so as to avoid unnecessarily burdening memory resources. As may be appreciated, if the new creation point is in a different loop than the previous creation point, then successively higher- and higher-numbered blocks from the set I are chosen until all inner loops are bypassed.

At step 930, a determination is made as to whether another use of the data object within the set $S_{use}$ is present and, if so, the method 900 returns to step 910 for such next use. Once all uses of the data object are accounted for, the method 900 proceeds to step 935. At step 935, an instruction that performs the data objects creation and initialization is inserted within the basic block $B_{create}$, as determined in steps 905–930, prior to any intra-block uses.

Computing the Destruction Point for an Object

Figure 10:
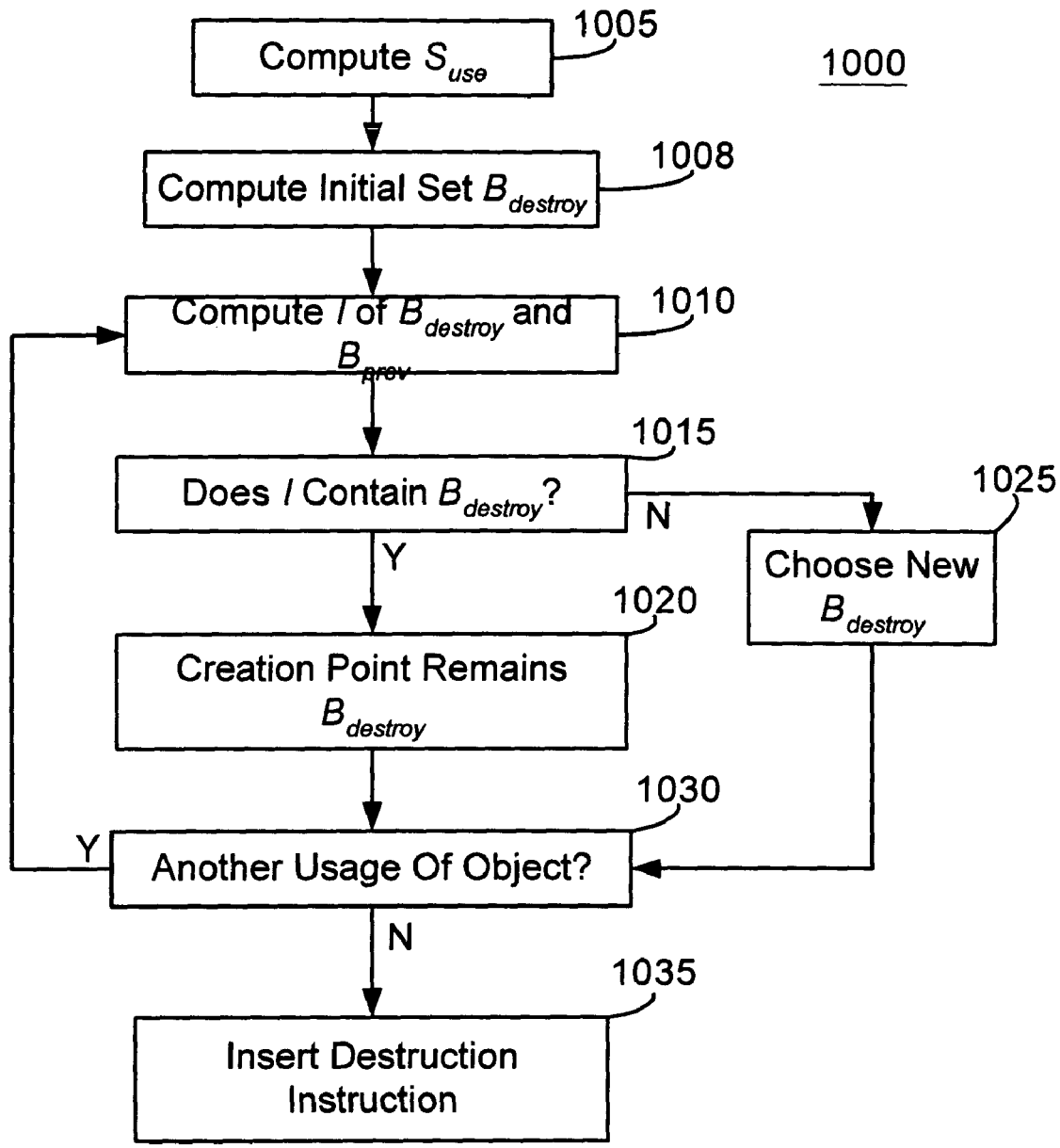
FIG. 10 is a flowchart illustrating an exemplary method of computing one or more destruction points for a data object in accordance with one embodiment of the present invention.

Turning now to FIG. 10, a method 1000 of computing one or more destruction points for a data object is illustrated. At step 1005, as was the case with step 905 of FIG. 9, above, a set $S_{use}$ of basic blocks that either read from or write to a data object is collected. As may be appreciated, the set $S_{use}$ is equal to the sum of a set of basic blocks that read from a data object, $S_{read}$, and the set of basic blocks that write to a data object, $S_{write}$. In one embodiment, an assumption is made that the data object of interest is destroyed at the last lexical use of the data object within the set $S_{use}$. Thus, the basic block that contains the last lexical use of the data object is referred to herein as $B_{destroy}$. This is, for example, the lowest-numbered basic block that refers to the data object. Every lexically previous usage of the data object within the set $S_{use}$, in one embodiment, is each subsequently higher-numbered basic block, $B_{prev}$. Accordingly, at step 1008 an initial set $B_{destroy}$ is computed, based on the last lexical use of the data object.

At step 1010, a compiler according to an embodiment of the present invention computes the intersection I of $B_{destroy}$'s post-dominators and $B_{prev}$'s post-dominators. At step 1015, a determination is made as to whether the set I contains $B_{destroy}$. If so, at step 1020 the destruction point of the data object of interest remains $B_{destroy}$. If not, at step 1025 a new destruction point $B_{destroy}$ is chosen from the set I, such that the depth-first number of the new destruction point is the largest number that is less than the depth-first number of the current destruction point. As a result, therefore, the destruction point of the data object occurs after such data object is last used so as to avoid unnecessarily burdening memory resources. As may be appreciated, if the new destruction point is in a different loop than the previous destruction point, then successively lower- and lower-numbered blocks from the set I are chosen until all inner loops are bypassed.

At step 1030, a determination is made as to whether another use of the data object within the set $S_{use}$ is present and, if so, the method 1000 returns to step 1010 for such next use. Once all uses of the data object are accounted for, the method 1000 proceeds to step 1035. At step 1035, an instruction that performs the data object's destruction and cleanup is inserted within the basic block $B_{destroy}$, as determined in steps 1005-1030, after any intra-block uses.

Computing Lock Points for Shared Objects

As may be appreciated, the computation of lock points appears similar to that of creation points, because it is desirable to place the locks as late as possible prior to the first use of a shared data object. However, locks for shared objects cannot be placed individually. The following exemplary XLANG/s code provides an example of the complications that arise when computing lock points.

```
parallel {
  task {
    ...
    scope synchronized {
      a = 5;
      b = 6;
    }
    ...
  }
  task {
    ...
    scope synchronized {
      b = 8;
      a = 9;
    }
    ...
  }
}
```

In the above exemplary code, in each parallel task, the objects a and b are accessed in opposite orders. An example of improper lock placement is provided in bold text in the following code example.

```
parallel {
  task {
    ...
    scope synchronized {
      LockWrite(a);
      a = 5;
      LockWrite(b);
      b = 6;
    }
    ...
  }
  task {
    ...
    scope synchronized {
      LockWrite(b);
      b = 8;
      LockWrite(a);
      a = 9;
    }
    ...
  }
}
```

If the above code is able to execute without interruption or error, the above lock placement may be acceptable. However, if the first task proceeds far enough to acquire a's lock, and then is interrupted, a deadlocked program may result. If, for example, after the above interruption, the second task proceeds to acquire b's lock, it will then become blocked because it cannot acquire a's lock. If the first task resumes after the interruption, it will not be able to proceed because it now cannot acquire b's lock. The process is therefore deadlocked.

An embodiment of the present works around this problem by considering the use-points of all the shared data objects within a synchronized scope, and placing locks for all such objects prior to the first use of any of the objects. Deadlocks are avoided by acquiring locks in a consistent order across all synchronized scopes. As may be appreciated, any lock order may be used if such order is consistent.

Using the method of FIGS. 11A–B, to be discussed below, the following lock placement, as denoted by the bold text, would result from the above code example.

```
parallel {
    task {
        ...
        scope synchronized {
            LockWrite(a);
            LockWrite(b);
            a = 5;
            b = 6;
        }
        ...
    }
    task {
        ...
        scope synchronized {
            LockWrite(a);
            LockWrite(b);
            b = 8;
            a = 9;
        }
        ...
    }
}
```

As may be appreciated, the above lock placement eliminates the deadlock problem as discussed above. As will be seen in the discussion of FIGS. 11A–B, below, an embodiment further distinguishes between reads and writes of the shared data objects. Therefore, if a shared object is never written to in a synchronized scope, the method according to an embodiment will acquire a read-lock only. As a result, single-writer, multiple-reader synchronization is enabled.

Figure 11A:
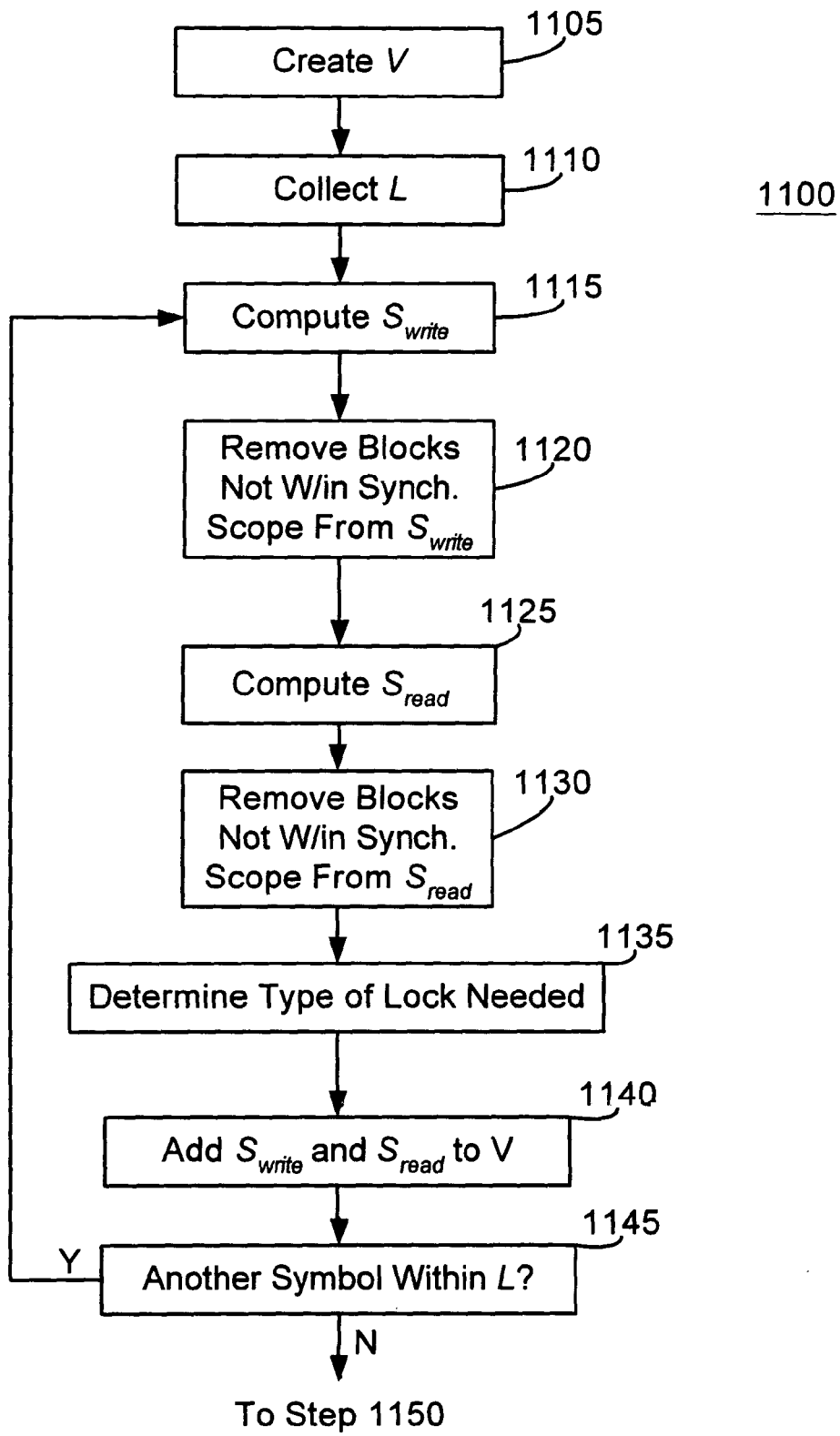
FIGS. 11A–B is a flowchart illustrating an exemplary method of placing lock points for a data object in accordance with one embodiment of the present invention.

Turning now to FIG. 11A, an exemplary method 1100 of placing lock points according to an embodiment of the present invention is provided. At step 1105, a set V of basic blocks, initially an empty set, is created. At step 1110, a set L of all shared data objects that require locking is collected. At step 1115, a set $S_{write}$ of basic blocks that write to the data object is created and, at step 1120 all basic blocks that are not contained within the synchronized scope are removed from $S_{write}$. At step 1125, a set $S_{read}$ of basic blocks that read from the data object is created and, at step 1130, all basic blocks that are not contained within the synchronized scope are removed from $S_{read}$. At step 1135, a determination is made as to the type of lock that is required. For example, if the set $S_{write}$ is empty, indicating that nothing is written to the data object, then the data object only requires a read-lock; otherwise, it requires a write-lock.

At step 1140, the sets $S_{write}$ and $S_{read}$ are added to V. At step 1145, a determination is made as to whether another data object is within the set L and, if so, the method 1100 returns to step 1115 for the next data object. Otherwise, the method 1100 proceeds to step 1150 on FIG. 11B, below.

Figure 11B:
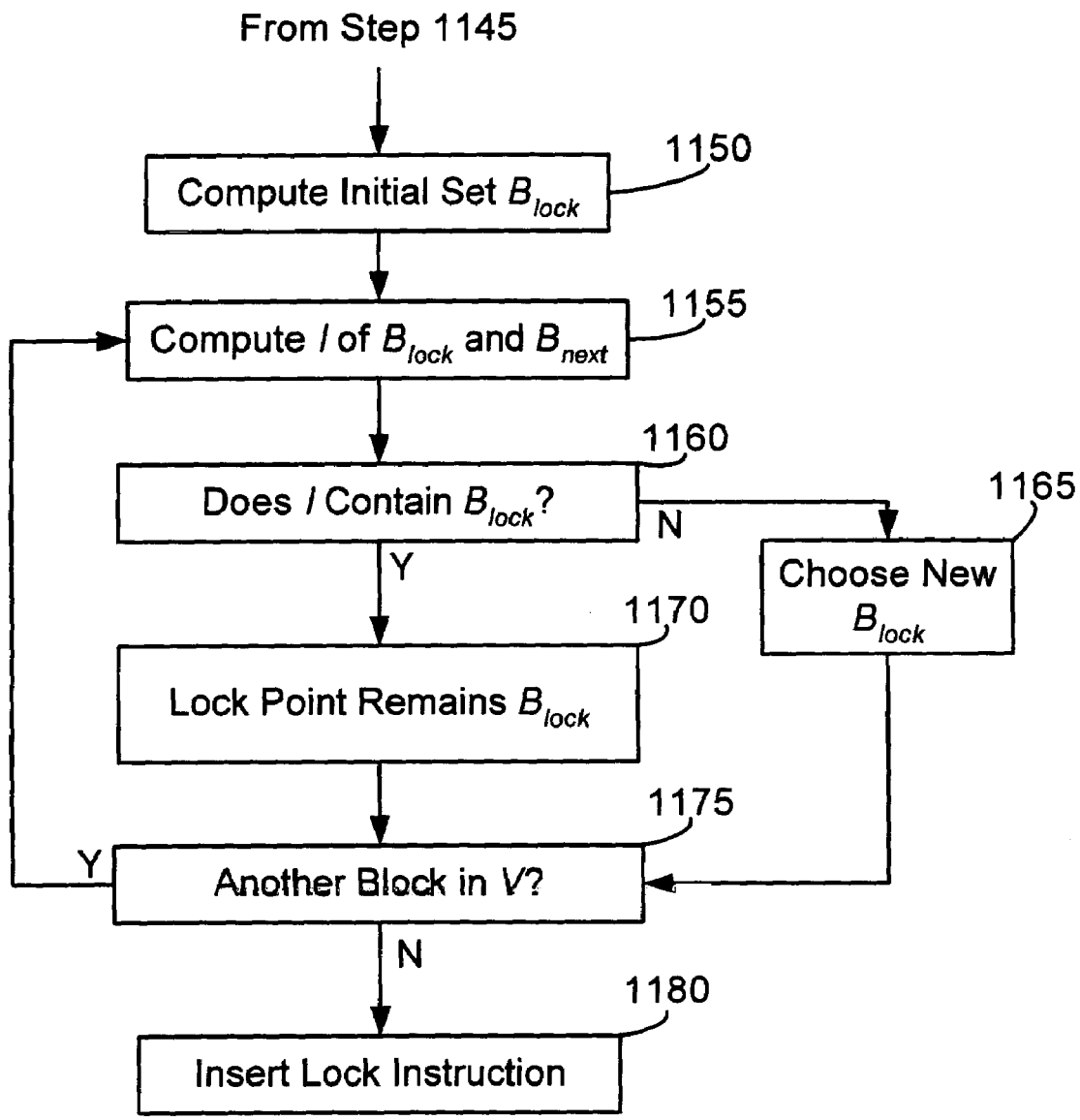

Turning now to FIG. 11B, the remainder of a method 1100 of placing lock points according to an embodiment of the present invention is illustrated. It will be appreciated that an assumption is made that all locks take place at the first lexical use of any shared object within the set V. Thus, the basic block that contains the first lexical use of the shared data object is referred to herein as $B_{lock}$. This is, for example, the highest-numbered basic block in the set V. Every lexically subsequent usage of the data object within V, in one embodiment, is each subsequently lower-numbered basic block, $B_{next}$. Accordingly, at step 1150 an initial set $B_{lock}$ is computed, based on the first lexical use of the data object.

At step 1155, a compiler according to an embodiment of the present invention computes the intersection I of $B_{lock}$'s pre-dominators and $B_{next}$'s pre-dominators. At step 1160, a determination is made as to whether the set I contains $B_{lock}$.

If so, at step 1170 the lock point of the data object of interest remains $B_{lock}$. If not, at step 1165 a new lock point $B_{create}$ is chosen from the set I, such that the depth-first number of the new lock point is the smallest number that is greater than the depth-first number of the current lock point. As a result, the lock point is created as close to the first use of the object as possible so as to avoid early locking of resources, while at the same time being placed in such a way as to avoid deadlocking the transaction. As may be appreciated, if the new lock point is in a different loop than the previous lock point, successively higher- and higher-numbered blocks are chosen from the set I until all inner loops are bypassed.

At step 1175, a determination is made as to whether another lexically subsequent block, $B_{next}$ is present within the set V is present and, if so, the method 1100 returns to step 1155 for such next block. Once all uses of the data object are accounted for, the method 1100 proceeds to step 1180. At step 1180, an instruction that locks—as either a read or write block, as determined above in connection with FIG. 11A—each shared object is placed in a deterministic order, prior to any intra-block uses.

Thus, a method and system for compiling XLANG/s code involving static dataflow analysis has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any configuration of business method software in any type of application environment. Therefore, the present invention should not be limited to any single embodiment, but rather should be construed in breadth and scope in accordance with the appended claims.

What is claimed:

1. A computer-implemented method of compiling computer code, comprising:
    creating a flowgraph according to abstract computer instructions, wherein the flowgraph has a plurality of basic blocks and at least one data object, and wherein the abstract instructions are translated from a parse tree formed from computer code;
    assigning a depth-first order to the plurality of basic blocks;
    determining a dominance relationship between the plurality of basic blocks;
    determining whether any loops are present within the flowgraph and, if any loops are present, identifying the loops;
    determining a usage of the at least one data object;
    determining a creation point, destruction point and lock point for the at least one data object according to the usage, identified loops, dominance relationship and depth-first order of the plurality of basic blocks; and
    inserting instructions into the computer code to create the at least one data object at the creation point, to destroy the at least one data object at the destruction point and to lock the at least one data object at the lock point; and
    wherein determining a creation point further comprises;
        identifying a first use of the at least one data object and identifying a first basic block in which the first use occurs from the plurality of basic blocks, wherein the first use of the at least one data object is the original creation point;

identifying a use of the at least one data object subsequent to the first use and identifying a second basic block in which the subsequent use occurs from the plurality of basic blocks;
calculating an intersection of the pre-dominators of the first basic block with the pre-dominators of the second basic block;
determining whether the intersection contains the first basic block; and
choosing, if the intersection does not contain the first basic block, a new creation point from the intersection.

2. The computer-implemented method of claim 1, wherein choosing a new creation point from the intersection comprises determining whether the new creation point is in a different loop than the original creation point and, if so, choosing a new creation point that bypasses all inner loops between the original creation point and the new creation point.

3. A computer-readable storage medium having computer-executable instructions that, when executed by a computer perform a method of compiling computer code, the method comprising:
creating a flowgraph according to abstract computer instructions, wherein the flowgraph has a plurality of basic blocks and at least one data object, and wherein the abstract instructions are translated from a parse tree formed from computer code;
assigning a depth-first order to the plurality of basic blocks;
determining a dominance relationship between the plurality of basic blocks;
determining whether any loops are present within the flowgraph and, if any loops are present, identifying the loops;
determining a usage of the at least one data object;
determining a creation point, destruction point and lock point for the at least one data object according to the usage, identified loops, dominance relationship and depth-first order of the plurality of basic blocks; and
inserting instructions into the computer code to create the at least one data object at the creation point, to destroy the at least one data object at the destruction point and to lock the at least one data object at the lock point; and
wherein determining a creation point further comprises:
identifying a first use of the at least one data object and identifying a first basic block in which the first use occurs from the plurality of basic blocks, wherein the first use of the at least one data object is the original creation point;
identifying a use of the at least one data object subsequent to the first use and identifying a second basic block in which the subsequent use occurs from the plurality of basic blocks;
calculating an intersection of the pre-dominators of the first basic block with the pre-dominators of the second basic block;
determining whether the intersection contains the first basic block; and
choosing, if the intersection does not contain the first basic block, a new creation point from the intersection;
inserting instructions into the computer code to create the at least one data object at the creation point, to destroy the at least one data object at the destruction point and to lock;
the at least one data object at the lock point; and
wherein determining a creation point further comprises:
identifying a first use of the at least one data object and identifying a first basic block in which the first use occurs from the plurality of basic blocks, wherein the first use of the at least one data object is the original creation point;
identifying a use of the at least one data object subsequent to the first use and identifying a second basic block in which the subsequent use occurs from the plurality of basic blocks;
calculating an intersection of the pre-dominators of the first basic block with the pre-dominators of the second basic block;
determining whether the intersection contains the first basic block; and
choosing, if the intersection does not contain the first basic block, a new creation point contained in the intersection.

4. The computer-readable storage medium of claim 3, wherein choosing a new creation point from the intersection comprises determining whether the new creation point is in a different loop than the original creation point and, if so, choosing a new creation point that bypasses all inner loops between the original creation point and the new creation point.

5. A method of compiling XLANG/s code, comprising:
creating a flowgraph having a plurality of basic blocks and at least one data object according to abstract computer instructions;
determining a dominance relationship between the plurality of basic blocks;
identifying any loops formed by the plurality of basic blocks;
determining a usage of the at least one data object according to the abstract instructions;
determining a creation point, destruction point and lock point for the at least one data object according to the usage, identified loops, dominance relationship and depth-first order of the plurality of basic blocks; and
inserting instructions into the computer code to create the at least one data object at the creation point, to destroy the at least one data object at the destruction point and to lock the at least one data object at the lock point; and
wherein determining a creation point further comprises:
identifying a first use of the at least one data object and identifying a first basic block in which the first use occurs, wherein the first use of the at least one data object is the original creation point;
identifying a second use of the at least one data object in a second basic block, wherein the second basic block is a higher-ordered basic block than the first basic block;
calculating an intersection of the pre-dominators of the first basic block with the pre-dominators of the second basic block;
determining whether the intersection contains the first basic block; and
choosing, if the intersection does not contain the first basic block, a new creation point contained in the intersection.

6. The method of claim 5, wherein choosing a new creation point from the intersection comprises determining whether the new creation point is in a different loop than the original creation point and, if so, choosing a new creation point that bypasses all inner loops between the original creation point and the new creation point.

* * * * *